(12) United States Patent
Nishiyama

(10) Patent No.: US 8,185,452 B2
(45) Date of Patent: May 22, 2012

(54) DOCUMENT PROCESSING SYSTEM AND COMPUTER READABLE MEDIUM

(75) Inventor: Kenji Nishiyama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 434 days.

(21) Appl. No.: 11/959,516

(22) Filed: Dec. 19, 2007

(65) Prior Publication Data

US 2008/0172401 A1 Jul. 17, 2008

(30) Foreign Application Priority Data

Dec. 19, 2006 (JP) .................................. 2006-341633
Nov. 22, 2007 (JP) .................................. 2007-302770

(51) Int. Cl.
*G06Q 10/00* (2006.01)
*G06Q 40/00* (2006.01)

(52) U.S. Cl. ........................................ 705/28; 705/7.28
(58) Field of Classification Search .................. 705/28
See application file for complete search history.

(56) References Cited

U.S. PATENT DOCUMENTS

| | | | |
|---|---|---|---|
| 5,887,154 A | 3/1999 | Iwasa et al. | |
| 5,999,724 A | 12/1999 | Iwasa et al. | |
| 6,311,166 B1 | 10/2001 | Nado et al. | |
| 2002/0152156 A1* | 10/2002 | Tyson-Quah | 705/38 |
| 2002/0156644 A1* | 10/2002 | Davies et al. | 705/1 |
| 2002/0194059 A1* | 12/2002 | Blocher et al. | 705/11 |
| 2004/0084277 A1 | 5/2004 | Blair | |
| 2004/0107115 A1 | 6/2004 | Takano et al. | |
| 2004/0236651 A1 | 11/2004 | Emde et al. | |
| 2004/0260634 A1 | 12/2004 | King et al. | |
| 2005/0055451 A1 | 3/2005 | Tsuyama et al. | |
| 2005/0137883 A1 | 6/2005 | Nohgawa et al. | |
| 2005/0258246 A1 | 11/2005 | Wolff et al. | |
| 2006/0004688 A1 | 1/2006 | Scanlon et al. | |
| 2006/0039045 A1 | 2/2006 | Sato et al. | |
| 2006/0052156 A1 | 3/2006 | Yates et al. | |
| 2006/0059026 A1* | 3/2006 | King et al. | 705/7 |
| 2006/0074699 A1 | 4/2006 | Samsky et al. | |
| 2006/0085442 A1 | 4/2006 | Fujiwara | |
| 2006/0212486 A1 | 9/2006 | Kennis et al. | |
| 2006/0268352 A1 | 11/2006 | Tanigawa et al. | |
| 2006/0277080 A1 | 12/2006 | DeMartine et al. | |
| 2007/0108270 A1 | 5/2007 | Bjoraker et al. | |
| 2007/0179870 A1 | 8/2007 | Goodbody et al. | |
| 2009/0018885 A1* | 1/2009 | Parales | 705/7 |

FOREIGN PATENT DOCUMENTS

CN 1518699 A 8/2004

(Continued)

OTHER PUBLICATIONS

Dr. John Lee & James Chong, "Management: Structured Approach Towards Operational Risk Management", EDGE (Malaysia), Jul. 16, 2001.*

(Continued)

*Primary Examiner* — Matthew Gart
*Assistant Examiner* — Seye Iwarere
(74) *Attorney, Agent, or Firm* — Sughrue Mion, PLLC

(57) ABSTRACT

A document processing system includes: an activity storage; a business process narrative storage; a risk storage; a control storage; an information extracting unit; and a document preparing and outputting unit.

2 Claims, 28 Drawing Sheets

FOREIGN PATENT DOCUMENTS

| | | |
|---|---|---|
| JP | 5-165844 A | 7/1993 |
| JP | 8-190587 A | 7/1996 |
| JP | 2003-196435 A | 7/2003 |
| JP | 2003-256633 A | 9/2003 |
| JP | 2006-040069 | 2/2006 |
| JP | 2006-110978 A | 4/2006 |
| JP | 2006-330863 A | 12/2006 |
| JP | 2007-026207 A | 2/2007 |

OTHER PUBLICATIONS

Chinese Office Action issued Jun. 28, 2010, in counterpart Chinese Application No. 200710181940.5, English translation.
U.S. Appl. No. 11/863,332.
U.S. Appl. No. 11/867,045.
U.S. Appl. No. 12/016,237.

* cited by examiner

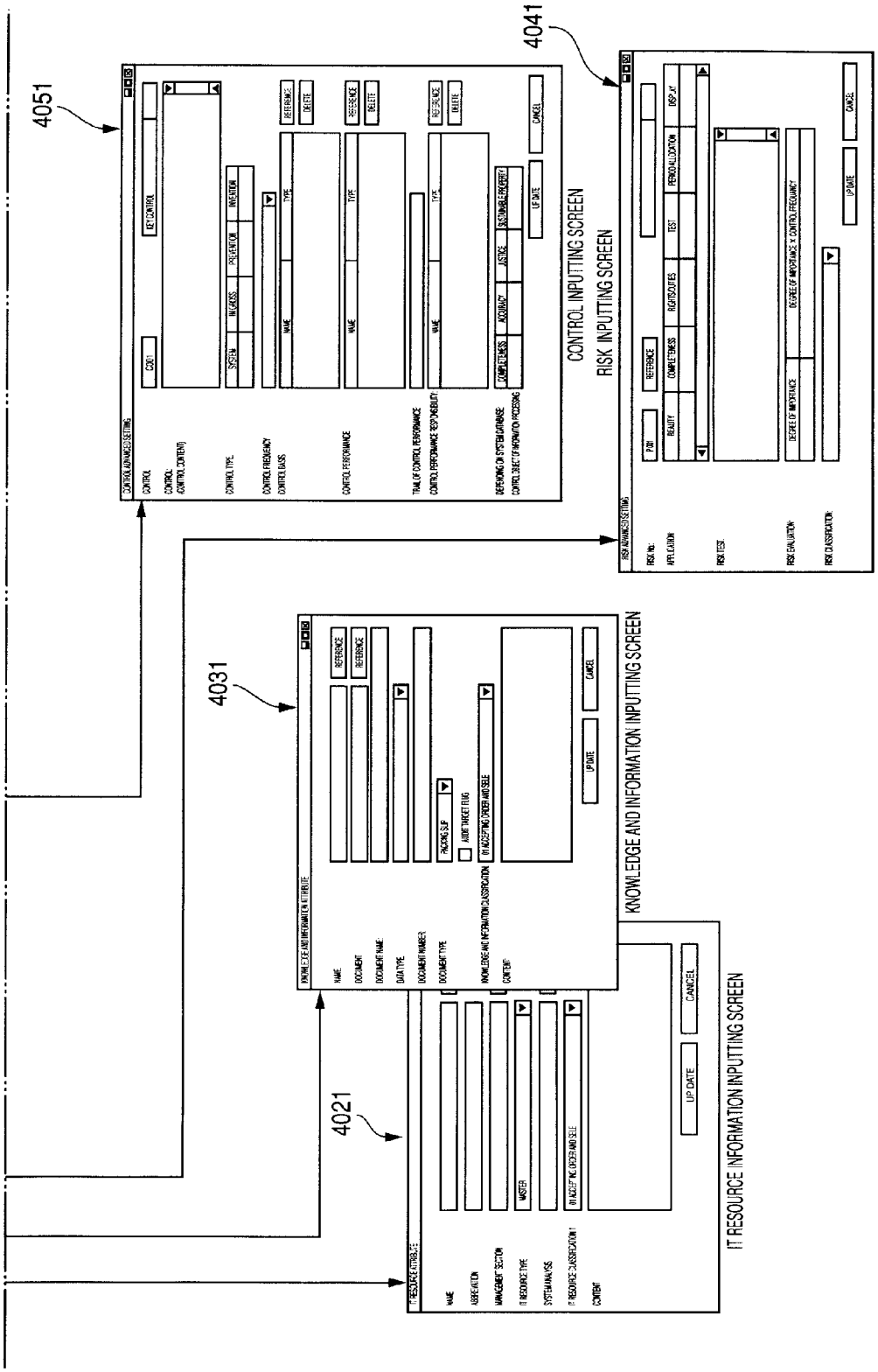

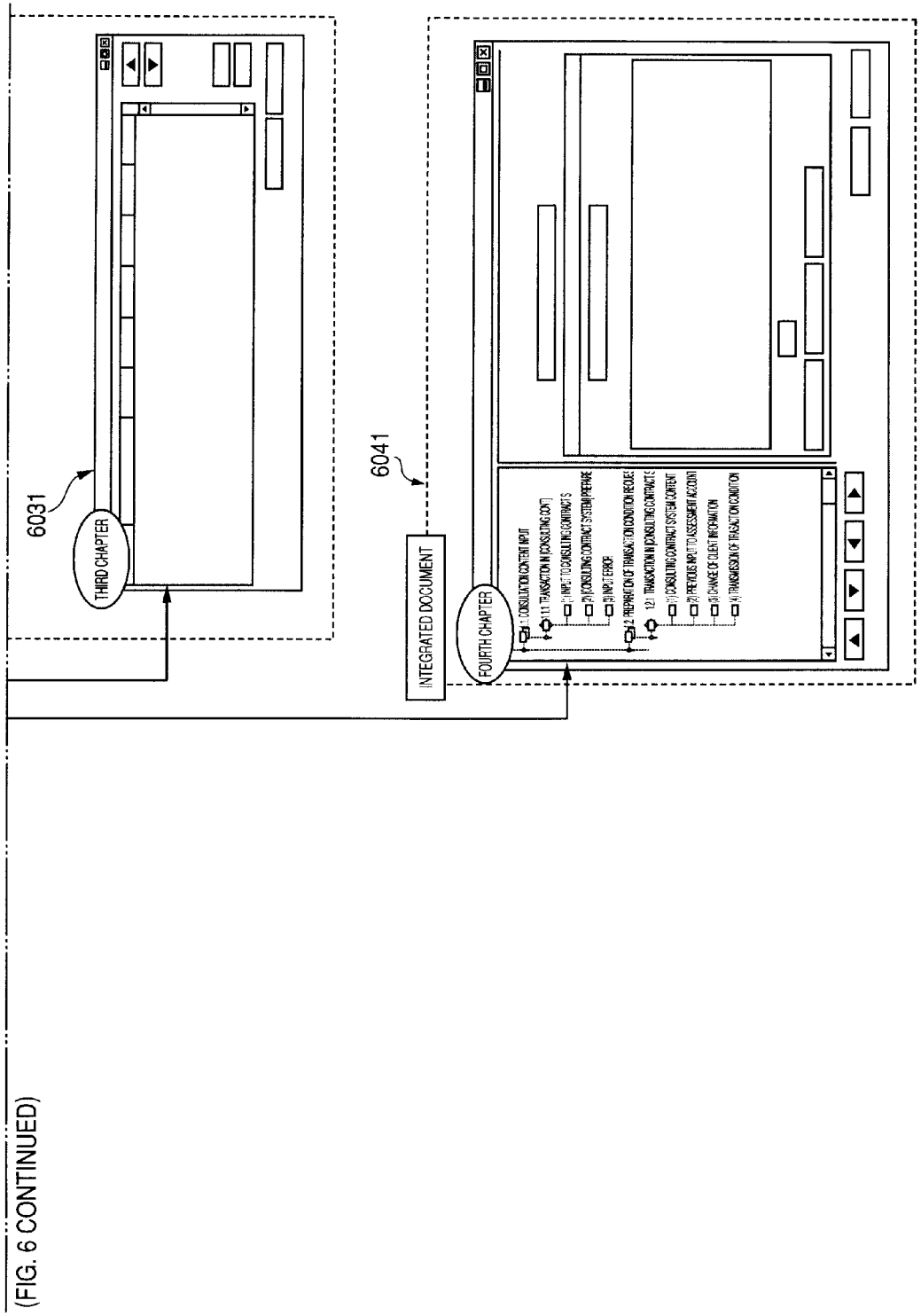

FIG. 8A

| | BUSINESS PROCESS NORRATIVE | | |
|---|---|---|---|
| COMPANY NAME | TEST COMPANY | ABBREVIATION | TEST COMPANY |
| PROCESS NAME | SALES, SALES COST_INSTRUMENT SALE | PROCESS ID | TG-001 |
| TRANSACTION TYPE | | TYPE | ROUTINE |
| TARGET BUSINESS, BUISINESS FIELD | | | |
| PROCESS OWNER | | | |
| PREPARATION DATE | 2006/10/04 | PREPARATOR | |
| UPDATING DATE | 2006/10/11 | UPDATING PERSON | |

1. TARGET RANGE AND PERSON IN CHARGE OF SUB PROCESS (INTERVIEW)

| | TARGET SUB PROCESS | HEARING SECTIION | HEARING RESPONDER |
|---|---|---|---|
| 1. | REGISTRATION OF ORDERING DATA AND ARRANGEMENT OF INVENTORY | | |
| 2. | DETERMINATION OF DELIVERY DESIGN | | |
| 3. | PICKING DELIVERY | | |
| 4. | DETERMINATION OF SHIPPING, DETERMINATION OF PERFORMANCE | | |
| 5. | CALCULATION | | |

FIG. 8B

2. PURPOSE AND FEATURE OF PROCESS

IS A PROCESS OF PERFORMING ARRANGEMENT OF INVENTORY INSTRUMENTS, DETERMINATION OF DELIVERY DESIGN, DETERMINATION OF SHIPING AND DELIVERY, AND BILLING CRITERION ON THE BASIS OF CLIENT ○○○○○○○○○○○○○○○○○○○○○○○○○ ○○○○○○○○○○○○○○○○○○○○○○○○○○○○○○○○○○○○○○○○○○○○○○○○○○○ ○○○○○○○○○○○○○○○○○○○○○○○○○○○○○○○○○○○○○○○○○○○○○○○○○○○

1. PROCESS RANGE          ○○○○○○○○○○○○○○○○○○○○○○○○○○○○○○○○○
                          ○○○○○○○○○○○○○○○○○○○○○○○

2. PRE-PROCESS            ○○○○○○○○○○○○○○○○○○○○○○○

3. POST-PROCESS           ○○○○○○○○○○○○○
                          ○○○○○○○○○○

4. PROCESS EXECUTION MANAGER   ○○○○○○○○○○○○○○○○○○○○○○○○○○○○○○○○○○○
                               ○○○○○○○○○○○○○○○○○○○○○○○○○○○○○○○○

FIG. 8C

| IMPORTANT ACCOUNTING ITEM | | ASSERTION | | | | | |
|---|---|---|---|---|---|---|---|
| ACCOUNTING ITEM CODE | IMPORTANT ACCOUNT | REALITY | COMPLETENESS | RIGHTS AND DUTIES | TEST | PERIOD ALLOCATION | DISPLAY |
| | | | | | | | |

3. RELEVANT IMPORTANT ACCOUNTING ITEM AND ASSERTION

FIG. 8D

4. SUB PROCESS
4.1 REGISTRATION OF RECEIVED ORDER DATA AND ARRANGEMENT OF INVENTORY
4.1.1 REGISTRATION OF TRANSMITTED AND RECEIVED CONTENTS
4.1.1.1 ORDER RECEPTION BY PHONE
(1) WHEN CLIENT IS REGISTERED
    (a) WHEN IT IS ARRANGEABLE
    (b) WHEN IT IS NOT ARRANGEABLE
(2) WHEN CLIENT IS NOT ACCURATELY REGISTERED IN CLIENT MASTER
    (a) PREPARATION OF TEMPORARY BILL
    (b) ADDITION TO PICKING LIST
4.1.1.2 ORDER RECEPTION BY FAX
4.2 DETERMINATION OF DELIVERY DESIGN
  4.2.1 DETERMINATION OF DELIVERY DESIGN
    4.2.1.1. ADJUSTMENT OF DELIVERY DESIGN (DETERMINATION OF CAR)
    4.2.1.2 DETERMINATION OF DELIVERY DESIGN
4.3 PICKING DELIVERY
4.4 DETERMINATION OF SHIPPING AND DETERMINATION OF PEROFRMANCE
4.5 SETTLEMENT

FIG. 9A

BUSINESS PROCESS NARRATIVE

| No. | SUB PROCESS | SUB STEP | BUSINESS CASE 1 | BUSINESS CASE 2 | RESPONSIBLE SUBJECT AND PARTICIPANT | CONTENT | LEDGER SHEET EVIDENCE | EXECUTION TIME | DETERMINATION CRITERION OR CONDITION |
|---|---|---|---|---|---|---|---|---|---|
| | | | | | | | | | |

RCM

| ASSERTION | | | RISK AND CONTROL No. | RECOGNIZED RISK | RECOGNIZED CONTROL | RISK TEST | | | RISK CLASSIFICATION | CONTROL TYPE |
|---|---|---|---|---|---|---|---|---|---|---|
| REALITY | COMPLETE-NESS | TEST | RIGHT/DUTIES | | | | IMPORTANCE | FREQUENCY | RISK TEST | | |
| | | | | | | | | | | | |

| EVIDENCE | PROCEDURE | TEST RESULT | COMMENT | REFERENCE EVIDENCE | KEY CONTROL |
|---|---|---|---|---|---|
| | | | | | |

⋮

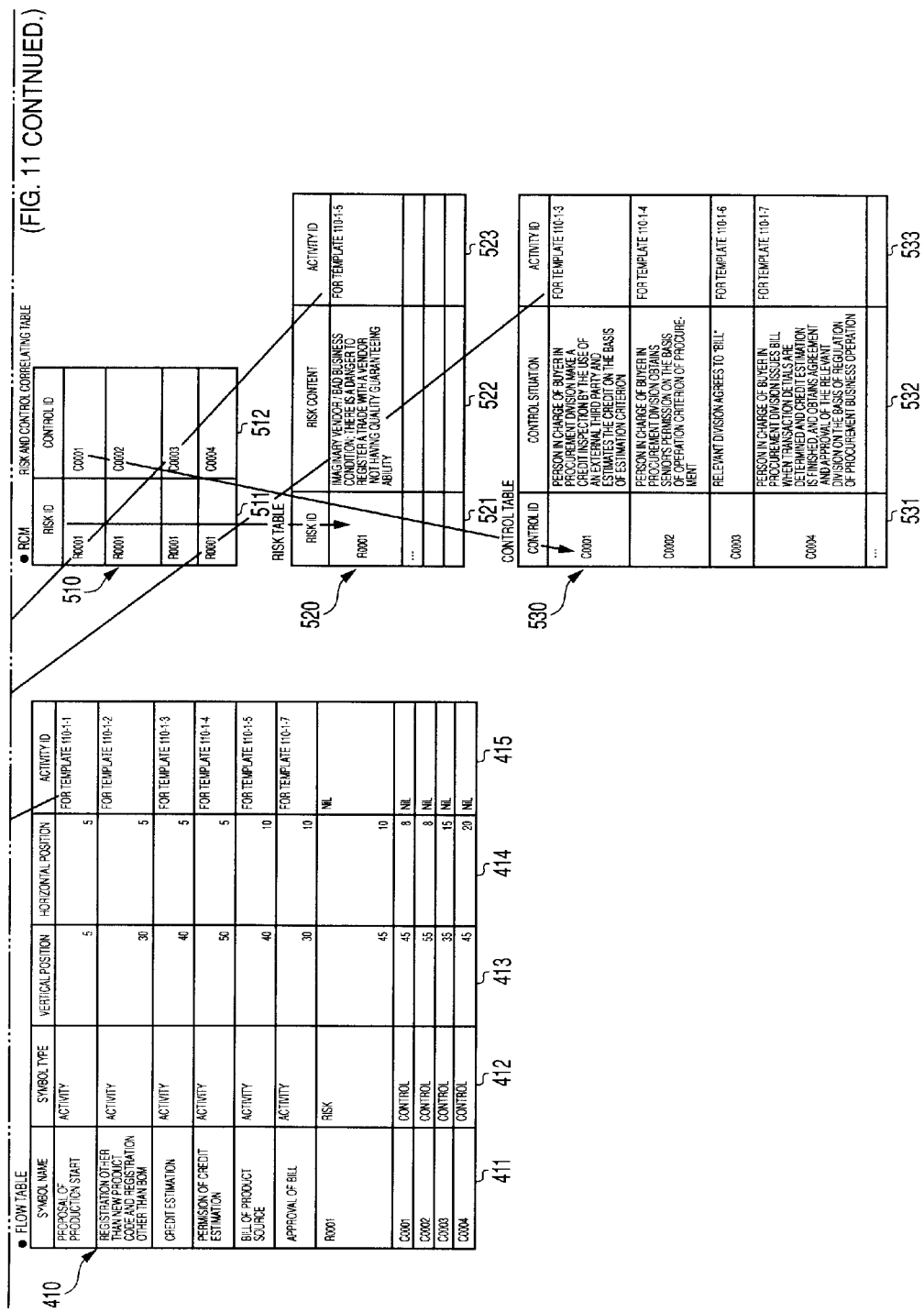
(FIG. 11 CONTINUED.)

FIG. 13

| No. | SUB PROCESS | RISK-OCCURRING ACTIVITY NAME | ASSERTION | | | | | | RISK (CHECK ITEM) | | RISK TEST | | RISK CLASSIFICATION |
|---|---|---|---|---|---|---|---|---|---|---|---|---|---|
| | | | REALITY | COMPLETENESS | RIGHTS / DUTIES | TEST | PERIOD ALLOCATION | DISPLAY | RISK No. | RISK CONTENT | EFFECT DEGREE | OCCURRENCE PROBABILITY | EFFECT DEGREE × OCCURRENCE PROBABILITY | |
| 1 | SELECTION AND REGISTRATION / UPDATE OF NEW PRODUCT SOURCE | BILL OF PRODUCT SOURCE | * | * | * | | | | R001 | IMAGINARY VENDOR / BAD BUSINESS CONDITION: THERE IS A DANGER TO REGISTER A TRADE WITH A VENDOR NOT HAVING QUALITY GUARANTEEING ABILITY | | HIGH | | FINANCE |
| 2 | SELECTION AND REGISTRATION / UPDATE OF NEW PRODUCT SOURCE | BILL OF PRODUCT SOURCE | * | * | * | | | | R001 | IMAGINARY VENDOR / BAD BUSINESS CONDITION: THERE IS A DANGER TO REGISTER A TRADE WITH A VENDOR NOT HAVING QUALITY GUARANTEEING ABILITY | | HIGH | | FINANCE |
| 3 | SELECTION AND REGISTRATION / UPDATE OF NEW PRODUCT SOURCE | BILL OF PRODUCT SOURCE | * | * | * | | | | R001 | IMAGINARY VENDOR / BAD BUSINESS CONDITION: THERE IS A DANGER TO REGISTER A TRADE WITH A VENDOR NOT HAVING QUALITY GUARANTEEING ABILITY | | HIGH | | FINANCE |
| 4 | SELECTION AND REGISTRATION / UPDATE OF NEW PRODUCT SOURCE | PREPARATION OF "REGISTRATION REQUEST" | * | * | * | | | | R002 | ERRONEOUS WRITING EXISTS IN "REGISTRATION REQUEST" AND PRODUCT SOURCE IS NOT CORRECTLY REGISTERED | | HIGH | | FINANCE |
| 5 | SELECTION AND REGISTRATION / UPDATE OF NEW PRODUCT SOURCE | PREPARATION OF "REGISTRATION REQUEST" | * | * | * | | | | R002 | ERRONEOUS WRITING EXISTS IN "REGISTRATION REQUEST" AND PRODUCT SOURCE IS NOT CORRECTLY REGISTERED | | HIGH | | FINANCE |
| 6 | SELECTION AND REGISTRATION / UPDATE OF NEW PRODUCT SOURCE | PREPARATION OF "REGISTRATION REQUEST" | * | * | * | | | | R002 | ERRONEOUS WRITING EXISTS IN "REGISTRATION REQUEST" AND PRODUCT SOURCE IS NOT CORRECTLY REGISTERED | | HIGH | | FINANCE |
| 7 | SELECTION AND REGISTRATION / UPDATE OF NEW PRODUCT SOURCE | REGISTRATION OF PRODUCT SOURCE | * | * | * | | | | R003 | INPUT MISS OCCURS AT THE TIME OF REGISTRATION IN SYSTEM | | HIGH | | FINANCE |
| 8 | SELECTION AND REGISTRATION / UPDATE OF NEW PRODUCT SOURCE | TRANSMISSION OF NEW PRICE | * | * | * | | | | R004 | INPUT OMISSION OR ERRONEOUS INPUT EXIST IN "ESTIMATE SHEET (OCR SHEET)" | | HIGH | | FINANCE |
| 9 | SELECTION AND REGISTRATION / UPDATE OF NEW PRODUCT SOURCE | TRANSMISSION OF NEW PRICE | * | * | * | | | | R004 | INPUT OMISSION OR ERRONEOUS INPUT EXIST IN "ESTIMATE SHEET (OCR SHEET)" | | HIGH | | FINANCE |
| 10 | SELECTION AND REGISTRATION / UPDATE OF NEW PRODUCT SOURCE | TRANSMISSION OF NEW PRICE | * | * | * | | | | | | | | | |

| ACTIVITY NAME TO BE CONTROLLED | CONTROL No. | KEY CONTROL | CONTROL CONTENT / CONTROL SITUATION | CONTROL TYPE — SYSTEM | MANUAL | IT EXISTENCE MANUAL | PREVENTIVE | DISCOVERABLE | CONTROL FREQUENCY | CONTROL BASIS | EVIDENCE OF CONTROL | CONTROL EXECUTION MANAGER | DEPENDENT SYSTEM / DATABASE | COMPLETENESS | ACCURACY | VALIDITY | MAINTENANCE |
|---|---|---|---|---|---|---|---|---|---|---|---|---|---|---|---|---|---|
| CREDIT ESTIMATION | C001 | | PERSON IN CHARGE OF BUYER IN PROCUREMENT DIVISION MAKE A CREDIT INSPECTION BY THE USE OF AN EXTERNAL THIRD PARTY AND ESTIMATES THE CREDIT ON THE BASIS OF ESTIMATION CRITERION | | * | | * | | FREQUENTLY | PROCUREMENT OPERATING RULE | | ○○ CENTER PROCURING MANAGER | | | | | |
| CREDIT ESTIMATION PERMISSION OF ESTIMATION | C002 | | PERSON IN CHARGE OF BUYER IN PROCUREMENT DIVISION OBTAINS SENIORS PERMISSION ON THE BASIS OF OPERATION CRITERION OF PROCUREMENT | | * | | | * | FREQUENTLY | PROCUREMENT OPERATING RULE | | ○○ CENTER PROCURING MANAGER | | | | | |
| AGREEMENT TO "BILL" | C003 | | PROCUREMENT DIVISION AGREES TO "BILL" | | * | | * | | FREQUENTLY | PROCUREMENT OPERATING RULE | BILL | GUARANTEE OF QUANTITY G, INNOVATION OF PROCESS G, MANAGEMENT OF PLANT G | | | | | |
| APPROVAL OF BILL | C004 | | PERSON IN CHARGE OF BUYER IN PROCUREMENT DIVISION ISSUES BILL WHEN TRANSACTION DETAILS ARE DETERMINED AND CREDIT ESTIMATION IS FINISHED, AND OBTAINS AGREEMENT AND APPROVAL OF THE RELEVANT DIVISION ON THE BASIS OF REGULATION OF PROCUREMENT BUSINESS OPERATION | | * | | | * | FREQUENTLY | PROCUREMENT OPERATING RULE | BILL | ○○ CENTER PROCURING MANAGER | | | | | |
| PERMISSION OF "REGISTRATION REQUEST" | C005 | | PERSON IN CHARGE OF BUYER IN PROCUREMENT DIVISION ISSUES "REGISTRATION REQUEST" DETERMINED BY NEW VENDOR AND OBTAINS SENIOR'S PERMISSION | | * | | * | | FREQUENTLY | PROCUREMENT OPERATING RULE | REGISTRATION REQUEST | ○○ CENTER PROCURING MANAGER | | | | | |
| CHECK OF CONENTS OF "REGISTRATION REQUEST" (MATERIAL G) | C006 | | VIA MATERIAL PROCUREMENT G, WHEN THERE IS ANY PROBLEM AS A CHECK RESULT OF CONTENTS, CORRECTION IS REQUESTED | | * | | | * | FREQUENTLY | PROCUREMENT OPERATING RULE | REGISTRATION REQUEST | ○○ CENTER PROCURING MANAGER | | | | | |
| CHECK OF CONENTS OF "REGISTRATION REQUEST" (PLANT ACCOUNTING) | C007 | | VIA ACCOUNTING SECTION PLANT ACCOUNTING G, WHEN THERE IS ANY PROBLEM AS A CHECK RESULT OF CONTENTS, CORRECTION IS REQUESTED | | * | | | * | FREQUENTLY | PROCUREMENT OPERATING RULE | REGISTRATION REQUEST | ACCOUNTING SECTION AND PLANT ACCOUNTING G | | | | | |
| UPDATE OF PRODUCT SOURCE MASTER | C008 | | REGISTERED MAST IS AUTOMATICALLY UPDATED FROM INTEGRATED PRODUCTION MANAGING SYSTEM TO PRODUCT MASTER OF [ACCOUNTING SYSTEM] IN NIGHT BATCH | | * | | | | EVERY DAY | | | ACCOUNTING SECTION AND PLANT ACCOUNTING | PURCHASE MASTER (PRODUCTION MANAGEMENT) | | | | |
| NEGOTIATION, DETERMINATION, AND REGISTRATION OF UNIT PRICE OF NEW PRODUCT SOURCE | C009 | | PERSON IN CHARGE OF BUYER IN PROCUREMENT DIVISION PERFORMS ESTIMATE CHECK. THE PERMISSION OF THE PROCUREMENT DIVISION IS PERFORMED IN ACCORDANCE WITH "ESTIMATE APPROVAL CRITERION" OF PROCUREMENT DIVISION | | * | | * | | FREQUENTLY | ESTIMATE SHEET DETERMINING CRITERION | ESTIMATE SHEET (OCR SHEET) | ○○ CENTER PROCURING MANAGER | UNIT PRICE OCR SYSTEM | | | | |
| CHECK OF "ESTIMATE SHEET (OCR SHEET)" | C010 | | PERSON IN CHARGE OF BUYER IN PROCUREMENT DIVISION CHECKS MATERIALS OF "ESTIMATE SHEET (OCR SHEET)" | | * | | | * | FREQUENTLY | ESTIMATE SHEET | ESTIMATE SHEET (OCR SHEET) | ○○ CENTER PROCURING MANAGER | | | | | |

FIG. 15

6000 — INTEGRATED DOCUMENT MENU

6001:

| COMPANY NAME | TEMPLATE | | ABBREVATION | |
|---|---|---|---|---|
| PROCESS NAME | INVENTORY CLEARANCE AND ASSET PURCHASE (CONSUMABLE MATERIALS): PREPARATION OF INTEGRATED DOCUMENT | | | |
| ROCESS ID | FOR TEMPLATE 110-1-1 | | | |
| TRANSACTION TYPE | | | TYPE | CURRENT PROFITS |
| TARGET BUSINESS AND BUSIESS FIELD | | | | |
| PROCESS OWNER | | | | |
| PREPARATION DATE AND TIME | 2007/08/14 14:54:58 | PREPARATOR | Kenji NISHIYAMA | |
| UPDATING DATE AND TIME | 2007/08/29 22:59:11 | UPDATING PERSON | Kenji NISHIYAMA | |

| | |
|---|---|
| 1. TARGET RANGE AND PERSON IN CHARGE OF SUB PROCESS (INTERVIEW) | EDIT |
| 2. PURPOSE AND FEATURE OF PROCESS | EDIT |
| 3. RELEVANT IMPORTANT ACCOUNT ITEM AND ASSERTION | EDIT |
| 4. SUB PROCESS | EDIT |
| 5. REVIEW OF USED INFORMATION SYSTEM | EDIT |

CLOSE

6011 — FIRST CHAPTER

1502 — 1. TARGET RANGE AND PERSON IN CHARGE OB SUB PROCESS (INTERVIEW)

1501 / 1503 / 1504

| | TARGET SUB PROCESS | HEARING SECTION | HEARING RESPONDER |
|---|---|---|---|
| 1 | SELECTION, REGISTRATION, AND UPDATE OF NEW PRODUCT SOURCE | MATERIAL PROCUREMENT G | |
| 2 | REGISTRATION OF UNIT COST OF PURCHASED PRODUCTS | MATERIAL PROCUREMENT G | |
| 3 | PREPARATION OF ORDER SHEET AND ORDERING | GUARANTEE OF QUANTITY G | |
| 4 | DELIVERY AND INSPECTION | MATERIAL PROCUREMENT G<br>QUALITY CONTROL G<br>GUARANTEE OF QUANTITY G | |
| 5 | ISSUANCE OF BILL | MATERIAL PROCUREMENT G | |
| 6 | PAYMENT | GUARANTEE OF QUANTITY G | |

ADD / INSERT / DELETE

UPDATE CANCEL

6021 — SECOND CHAPTER

1511 — PURPOSE AND FEATURE OF PROCESS

- PURPOSE OF PROCESS: PROCESSES FOR PURCHASE, SUPPLY, AND PAYMENT RAW OF MATERIALS AND PARTS ASSOCIATED WITH PRODUCTION OF CONSUMABLE GOODS IN PLANT (OTHER THAN TO DO TO DE CR) ARE DESCRIBED

1512 — RANGE OF PROCESS: PROCESSES FROM SELECTION AND REGISTRATION OF NEW PRODUCT SOURCE UNTIL REGISTRATION OF PURCHASE PRICE FOR RAW MATERIAL, ORDERING OF RAW MATERIAL AND PARTS, FIXING OF THE AMOUNT PAYABLE, STORAGE OF BILL, AND EXPENSES ARE DESCRIBED

1513 — PRE-PROCESS:
COST ACCOUNTING_R&D PROJECT ACCOUNTING
COST ACCOUNTING_COST ACCOUNTING_PRODUCTION OF CONSUMABLE GOODS

1514 — POST-PROCESS:
PRESENT DEPOSIT PAYMENT
COST ACCOUNTING
INVENTORY CLEARANCE
ASSET MANAGEMENT
FINANCIAL STATEMENT PREPARATION _ FINANCIAL STATEMENT PREPARATION _ FINANCIAL STATEMENT PREPARATION

1515 — PROCESS EXECUTION MANAGER: PROCUREMENT MANAGER TAKES CHARGE OF THE ORDERING TO STORAGE OF THE BILL

UPDATE CANCEL

FIG. 17A

BUSINESS PROCESS NARRATIVE

| COMPANY NAME | | TEMPLATE | | ABBREVIATION | |
|---|---|---|---|---|---|
| PROCESS NAME | | INVENTORY CLEARANCE AND ASSET PURCHASE (CONSUMABLE GOODS AND RAW MATERIALS): INTEGRATED DOCUMENT FORMAT | | PROCESS ID | FOR TEMPLATE 110-1 |
| TRANSACTION TYPE | | | | TYPE | ROUTINE |
| TARGET BUSINESS, BUSINESS FIELD | | | | | |
| PROCESS OWNER | | | | | |
| PREPARATION DATE | | 2007/08/14 | | PREPARATOR | AA |
| UPDATING DATE | | 2007/08/29 | | UPDATING PERSON | AA |

1. TARGET RANGE AND PERSON IN CHARGE OF SUB PROCESS (INTERVIEW)

| | SUB PROCESS AS TARGET | HEARING DIVISION | HEARING RESPONDER |
|---|---|---|---|
| 1. | SELECTION, REGISTRATION, AND UPDATE OF NEW PRODUCT SOURCE | MATERIAL PROCUREMENT G | BB |
| 2. | REGISTRATION OF UNIT COST OF PURCHASED PRODUCTS | MATERIAL PROCUREMENT G | BB |
| 3. | PREPARATION OF ORDER SHEET AND ORDERING | GUARANTEE OF QUANTITY G | CC |
| 4. | DELIVERY AND INSPECTION | MATERIAL PROCUREMENT G<br>QUALITY CONTROL G<br>GUARANTEE OF QUANTITY G | BB<br>DD<br>EE |
| 5. | ISSUANCE OF BILL | MATERIAL PROCUREMENT G | BB |
| 6. | PAYMENT | GUARANTEE OF QUANTITY G | EE |

FIG. 17B

2. PURPOSE AND FEATURE OF PROCESS

PROCESSES FOR PURCHASE, SUPPLY, AND PAYMENT RAW OF MATERIALS AND PARTS ASSOCIATED WITH PRODUCTION OF CONSUMABLE GOODS IN PLANT (OTHER THAN TO DO TO DECR) ARE DESCRIBED

1. RANGE OF PROCESS: PROCESSES FROM SELECTION AND REGISTRATION OF NEW PRODUCT SOURCE UNTIL REGISTRATION OF PURCHASE PRICE FOR RAW MATERIAL, ORDERING OF RAW MATERIAL AND PARTS, FIXING OF THE AMOUNT PAYABLE, STORAGE OF BILL, AND EXPENSES ARE DESCRIBED

2. PRE-PROCESS: COST ACCOUNTING _ R&D PROJECT ACCOUNTING
COST ACCOUNTING _ COST ACCOUNTING _ PRODUCTION OF CONSUMABLE GOODS

3. POST-PROCESS: PRESENT DEPOSIT PAYMENT,
COST ACCOUNTING,
INVENTORY CLEARANCE / ASSET MANAGEMENT,
FINANCIAL STATEMENT PREPARATION _ FINANCIAL STATEMENT PREPARATION _ FINANCIAL STATEMENT PREPARATION

4. PROCESS EXECUTION MANAGER: PROCUREMENT MANAGER TAKES CHARGE OF THE ORDERING TO STORAGE OF THE BILL

FIG. 17C

3. RELEVANT IMPORTANT ACCOUNT ITEM AND ASSERTION

| IMPORTANT ACCOUNTING ITEM | | | ASSERTION | | | | |
|---|---|---|---|---|---|---|---|
| ACCOUNTING ITEM CODE | IMPORTANT ACCOUNT | REALITY | COMPLETENESS | RIGHTS / DUTIES | TEST | PERIOD ALLOCATION | DISPLAY |
| 005000 | INVENTORY CLEARANCE | * | – | – | – | – | * |

FIG. 17D

4. SUB PROCESS 4.1 SELECTION, REGISTRATION, AND UPDATE OF NEW PRODUCT SOURCE
4.1.1 PROPOSAL OF PRODUCTION START
4.1.1.1 PROPOSAL OF PRODUCTION START
    Activity No.:     FOR TEMPLATE 110-1-1
    ACTIVITY CONTENT:     IINFROM RELEVANT DIVISIONS (GUARANTEE OF QUANTITY G, INNOVATION OF PROCESS G, PLANT MANAGEMENT G) OF INFORMATION SUCH AS PRODUCT CODE AND BOM
    RISK No.:
    CONTROL No.:

4.1.2 REGISTRATION OTHER THAN NEW PRODUCT CODE AND REGISTRATION OTHER THAN BOM
    4.1.2.1 REGISTRATION OTHER THAN NEW PRODUCT CODE AND REGISTRATION OTHER THAN BOM
    Activity No.:     FOR TEMPLATE 110-1-2
    ACTIVITY CONTENT:     INPUTTING AND REGISTRATION ARE PERFORMED THROUGH [PRODUCT AND PART NUMBER MASTER REGISTERING SCREEN] OF [INTEGRATED PRODUCTION MANAGING SYSTEM]
    [INTEGRATED PRODUCTION MANAGING SYSTEM] IS AUTOMATICALLY UPDATED TO [PRODUCT MASTER] OF [ACCOUNTING SYSTEM] IN NIGHT BATCH.
    RISK No.:
    CONTROL No.:

FIG. 17E

5. REVIEW OF USED INFORMATION SYSTEM 5.1 USED SYSTEM
  5.1.1 ACCOUNTING SYSTEM
    MANAGEMENT DIVISION:
    CONTENT:

| NAME | TYPE | CONTENT |
|---|---|---|
| PRODUCT SOURCE MASTER (ACCOUNTING) | MASTER | |

5.1.2 PURCHASED PRODUCT CALCULATING SYSTEM
    MANAGEMENT DIVISION:
    CONTENT:

5.1.3 UNIT PRICE OCR SYSTEM
    MANAGEMENT DIVISION:
    CONTENT:
5.1.4 ORDERING SYSTEM
    MANAGEMENT DIVISION:
    CONTENT:
5.1.5 INTEGRATED PRODUCTION MANAGING SYSTEM
    MANAGEMENT DIVISION:
    CONTENT:

| NAME | TYPE | CONTENT |
|---|---|---|
| PURCHASE MASTER (PRODUCTION MANAGEMENT) | MASTER | |
| INCOME STORING SCREEN | SCREEN | |
| UNIT PURCHASE COST INFORMATION REGISTERING AND UPDATING SCREEN | SCREEN | |
| RED-BLACK SCREEN | SCREEN | |
| INSPECTION SCREEN | SCREEN | |
| PARTS AND PART NUMBER MASTER REGISTERING SCREEN | SCREEN | SCREEN FOR REGISTERING PRODUCT INFORMATION IN PARTS AND PART NUMBER MASTER |

5.1.6 X-S SYSTEM
    MANAGEMENT DIVISION:
    CONTENT:

5.1.7 PRODUCTION SYSTEM
    MANAGEMENT DIVISION:
    CONTENT:

FIG. 18A

BUSINESS PROCESS NARRATIVE

| No. | SUB PROCESS | SUB PROCESS | BUSINESS CASE 1 | BUSINESS CASE 2 | RESPONSIBLE SUBJECT AND PARTICIPANT | CONTENTS | LEDGER SHEET EVIDENCE | EXECUTION TIME | DETERMINATION CRITERION OR CONDITION |
|---|---|---|---|---|---|---|---|---|---|
| 1 | SELECTION AND REGISTRATION/ UPDATE OF NEW PRODUCT SOURCE | REGISTRATION OTHER THAN NEW PRODUCT CODE AND REGISTRATION OTHER THAN BOM | | | PERSON IN CHARGE OF GUARANTEE OF QUANTITY G, INNOVATION OF PROCESS G, PLANT MANAGEMENT G | INPUTTING AND REGISTERING ARE PERFORMED THROUGH [PRODUCTS AND PART NUMBER MASTER REGISTERING SCREEN] OF INTEGRATED PRODUCTION MANAGING SYSTEM. [INTEGRATED PRODUCTION MANAGING SYSTEM] IS AUTOMATICALLY UPDATED TO PRODUCT MASTER] OF [ACCOUNTING SYSTEM] IN NIGHT BATCH. | | TIME POINT WHEN PRODUCT SOURCE IS DETERMINED | CHECK CRITERION OF PRODUCT SOURCE |
| ⋮ | | | | | | | | | |

FIG. 18B

RCM

| RISK AND CONTROL No. | RECOGNIZED RISK | RECOGNIZED CONTROL | ASSERTION | | | | | RISK TEST | | | RISK CLASSIFICATION | CONTROL TYPE |
|---|---|---|---|---|---|---|---|---|---|---|---|---|
| | | | REALITY | COMPLETENESS | TEST | RIGHT/DUTIES | IMPORTANCE | FREQUENCY | RISK TEST | | | |
| R001 | IMAGINALY VENDOR/ BAD BUSINESS CONDITION, THERE IS A DANGER TO REGISTER A TRADE WITH A VENDOR NOT HAVING QUALITY GUARANTEEING ABILITY | C001, C002, C003, C004 | | | | | | | HIGH | | FINANCE | |
| ⋮ | | | | | | | | | | | | |

| EVIDENCE | PROCEDURE | TEST RESULT | COMMENT | REFERENCE EVIDENCE | KEY CONTROL |
|---|---|---|---|---|---|
| | | | | | |
| ⋮ | | | | | |

DOCUMENT PROCESSING SYSTEM AND COMPUTER READABLE MEDIUM

CROSS-REFERENCE TO RELATED APPLICATIONS

This application is based on and claims priority under 35 U.S.C. 119 from Japanese Patent Application No. 2006-341633 filed Dec. 19, 2006 and Japanese Patent Application No. 2007-302770 filed Nov. 11, 2007.

BACKGROUND

1. Technical Field

The present invention relates to a document processing system and a computer readable medium.

2. Related Art

Financial internal control has been required. The "internal control-integrative framework" issued from the COSO (Committee of Sponsoring Organizations of the Treadway Commission) in 1992 serves as the substantial standard of the financial internal control, which is defined as "one process performed by a board of management, an executive, and other staffs having intended to provide reasonable guarantee so as to accomplish three objects of (1) effectiveness and efficiency of businesses, (2) reliability of financial statement, and (3) observance of relevant rules."

In the financial internal control, it requires great labor supplies from the manual point of view that activities/systems/resources/knowledge and information are correlated to make documentation of business processes and to construct structures for utilizing the documents. The documents of the financial internal control includes four documents of a business process narrative, a business flow diagram, an RCM (Risk and Control Matrix), and a separation-of-duties table.

The four documents of the financial internal control are correlated with each other. Accordingly, when a relevant portion of a certain document is corrected, it requires a great labor supply that the other documents are corrected. However, the other documents are not actually corrected, thereby causing disagreement between the documents. That is, the documents are ledger sheets that make it difficult to know correlations between the documents and to look over and utilize contents of businesses, risks, and controls.

The documentation work of the financial internal control is carried out in the unit of several tens persons. It is a difficult work that the levels (sizes) are made constant so as not to cause disagreement when the four documents are prepared individually.

In this way, when the documents having deviations in quality are prepared, risks of proper businesses are not found out or deviations occur in test item of a test phase which is a next step of the financial internal control. As a result, in order to obtain such a quality level to pass an audit, a manual feedback work for canceling the deviations is required.

SUMMARY

According to an aspect of the present invention, a document processing system including: an activity storage that correlates and stores activity identifiers for uniquely identifying activities, activity names, responsible subjects, and activity contents; a business process narrative storage that correlates and stores levels of a plurality of layers indicating business processes and activity identifiers; a risk storage that correlates and stores risk identifiers for uniquely identifying risks, risk names, and activity identifiers; a control storage that correlates and stores control identifiers for uniquely identifying controls, control names, and activity identifiers; an information extracting unit that extracts the activity name, the responsible subject, and the activity content, which correspond to the specific activity identifier stored in the activity storage on the basis of the activity identifier, extracts the levels of the plurality of layers indicating the business processes, which correspond to the specific activity identifier stored in the business process narrative storage on the basis of the activity identifier, extracts the risk name, which corresponds to the specific activity identifier stored in the risk storage on the basis of the activity identifier, and extracts the control name, which corresponds to the specific activity identifier stored in the control storage on the basis of the activity identifier; and a document preparing and outputting unit that prepares and outputs an internal control document visually displaying the activity name, the responsible subject, the activity content, the levels of the plurality of layers indicating the business processes, the risk name, and the control name, which are extracted by the information extracting unit.

BRIEF DESCRIPTION OF THE DRAWINGS

Exemplary embodiment of the present invention will be described in detail based on the following figures, wherein:

FIG. 8 is an explanatory diagram illustrating an output (in the form of a business process narrative) of an integrated document;

FIG. 9 is an explanatory diagram illustrating an output (in the form of a table) of an integrated document;

FIG. 15 is an explanatory diagram specifically illustrating a specific example of a relation between screens for displaying an integrated document;

FIG. 17 is an explanatory diagram illustrating a specific example of an output (in the form of a business process narrative) of an integrated document;

FIG. 18 is an explanatory diagram illustrating a specific example of an output (in the form of a table) of an integrated document;

DETAILED DESCRIPTION

First, "four basic documents" of internal control will be described.

The four basic documents mean basic documents prepared every business process to be subjected to the financial internal control and include a business process narrative, a business flow diagram, an RCM (Risk Control Matrix), and a separation-of-duties table.

The business process narrative is also called a narrative and is obtained by making documentation of a flow of business from the start of transaction to the booking and reporting of the final general ledger. Regulation documents of personnel regulations, accounting business regulations, and the like are upper-level documents of the business process narrative and the revision thereof affects the business process narrative. A business manual is a lower-level document of the business process narrative and is affected by the revision thereof.

The business flow diagram is obtained by visually displaying a flow of business from the start of transaction to the booking and reporting of the final general ledger in a flowchart. The risks and the controls are arranged on the flow diagram.

The RCM (Risk and Control Matrix) is obtained by arranging the control points (assertions) to be accomplished and the risks to be considered and the corresponding inner control activities, with respect to the inner control activities associated with the business processes.

The separation-of-duties is intended to check whether a person-in-charge's repeated processing which causes a problem in the financial internal control occurs in the flow of business processes.

The assertion is a precondition for the reliability of financial information. Specifically, six items of reality, completeness, test, rights and duties, period/allocation, and display are generally used. However, it is preferable that they could be customized since a part may be changed by companies or auditing corporations.

The risk means a disincentive to an assertion to be considered in a business process.

The control means an internal control activity on a risk has control types of preventive, discoverable, and the like.

The financial internal control includes two types of tests of a maintenance test (hereinafter, referred to as work through and abbreviated as WT) for checking validity and correctness of a document obtained by analyzing a financial business and arranging the results thereof and an operation test for testing whether the financial internal control should be operated as described in the document.

Hereinafter, exemplary embodiments of the invention will be described with reference to the drawings.

In a financial internal control, a system for utilizing a document is constructed by arranging correlations between activities, systems, resources, and knowledge and information to make documentation of a business process. The system is generally constructed in the unit of a company and one system is used in relevant companies (including subsidiary companies and parent companies).

Figure 2:
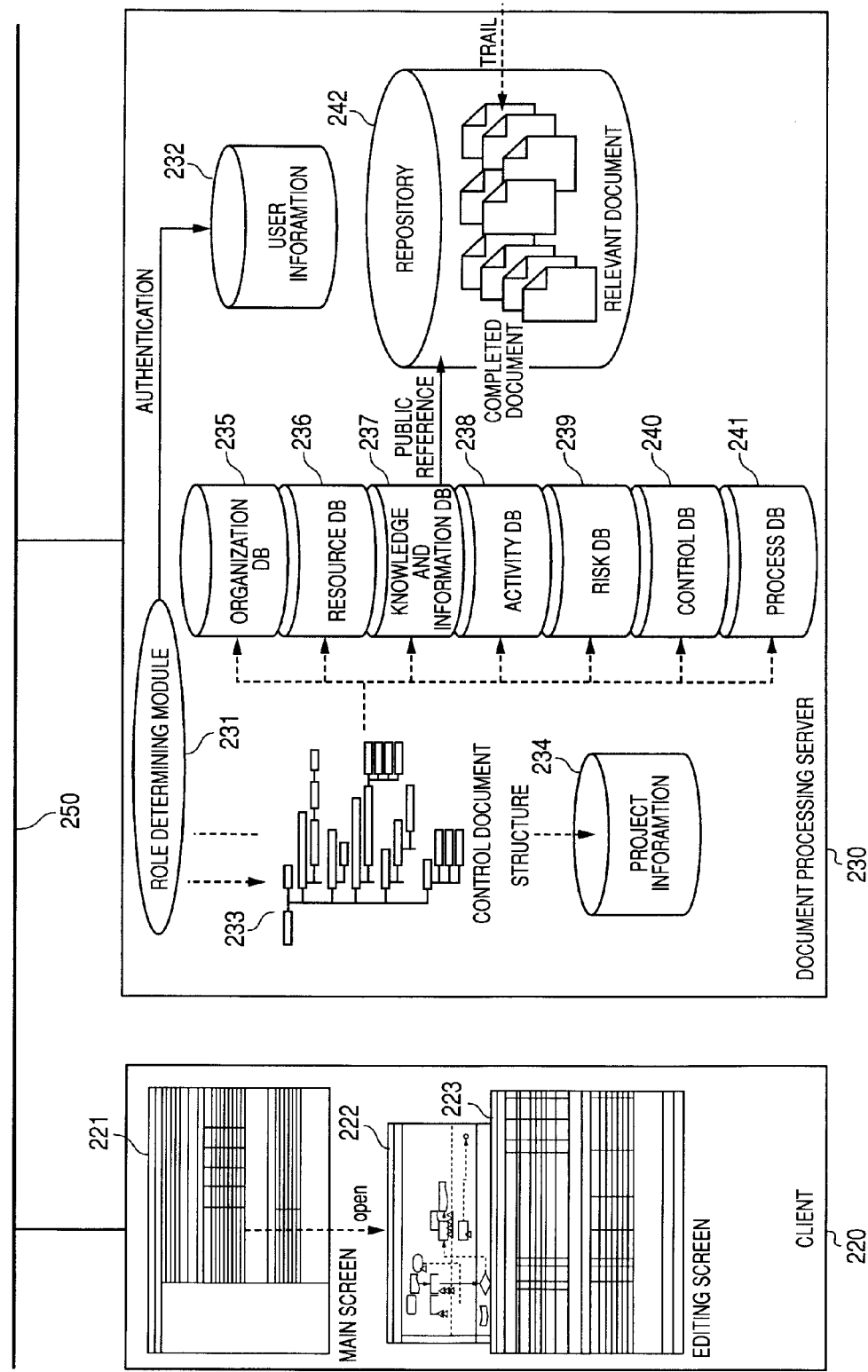
FIG. 2 is a block diagram illustrating an entire configuration of a system.

An entire configuration of a system for performing the financial internal control according to an embodiment of the invention will be described with reference to FIG. 2.

The system includes a client 220 and a document processing server 230 as a whole. The elements may be plural. The client 220 and the document processing server 230 are connected to each other though a communication network 250. In addition, the client 220 and the document processing server 230 describe data in the XML (eXtensible Markup Language) and are connected to each other by the use of a communication protocol such as the HTTP (Hyper Text Transfer Protocol).

The client 220 has a function of a user interface allowing a user to use a main screen 221, an editing screen 222, and an editing screen 223. For example, operators of a parent company A and a subsidiary company B operate the clients 220, respectively.

In order to prepare a document of the financial internal control, the client 220 displays a main screen 221 and displays the editing screen 222 for preparing a document. The editing screen 222 is used to prepare four control documents (a flowchart of a business process, a narrative, a risk and control matrix, and a separation-of-duties table) or to refer to the documents.

The document processing server 230 includes a role determining module 231. The role determining module 231 determines whether an operator has a valid role (right) on an access from the client 220, by the use of user information 232.

When the operator has a valid role, the access to the control documents 233 is permitted to the client 220. The control documents 233 displayed on the editing screen 223 have a tree structure. That is, a business includes plural businesses, which form a layer structure. Since the control documents 233 are prepared to correspond to the businesses, the control documents 233 have a tree structure. One business is correlated with four kinds of control documents 233. The control documents 233 are stored in project information 234.

The control documents 233 are prepared using common elements. Here, the common elements include activities, resources, and knowledge and information, which are published and can be used by a person in charge of preparation of a document. Organizations as a common element are stored in an organization DB 235, resources as a common element are stored in a resource DB 236, knowledge and information as a common element is stored in a knowledge and information DB 237, activities as a common element are stored in an activity DB 238, risks as a common element are stored in a risk DB 239, controls as a common element are stored in a control DB 240, and processes as a common element are stored in a process DB 241. An activity is a business activity executed by a person in the process, a resource is a resource associated with system processing, system data, and IT, and knowledge and information is a document group associated with a process, such as regulations and manuals.

Information (company names, addresses, and the like) on the company having prepared the control document, organization information, user information, and account information are stored in an organization DB235.

The organization DB 235 refers to relevant documents and completed documents in a repository 242. On the contrary, documents to be opened in the organization DB 235 are stored in the repository 242. Some of the documents stored in the repository 242 are used as auditing evidence (ledger sheets and the like). The auditing evidence is used for an auditor (internal auditor or external auditor) to perform a tracing survey on a matter in accordance with an auditing polish.

The document processing server 230 may be embodied by a single server, or may be embodied by plural servers. For example, the user information 232 and the repository 242 may be embodied as servers of different document databases.

A conceptual configuration of modules according to this embodiment will be described with reference to FIG. 1.

A module generally indicates an element such as software and hardware which can be separated logically. Accordingly, the module according to this embodiment includes modules in programs, and also includes modules in hardware. Therefore, this embodiment also provides a program, a device, a system, and a method. Modules substantially correspond to functions in one to one. However, actually, one module may be constituted by one program, plural modules may be constituted by one program, or one module may be constituted by plural programs. Plural modules may be put into practice by one computer or one module may be put into practice by plural computers in a distributed or parallel environment. In the following description, "connection" includes logical connection in addition to physical connection. For example, connection between data and data indicates a case where a part of data is shared or a case where one data points the other data by the use of a pointer or a link.

A system includes a case where plural computers, hardware, and apparatuses are connected to a network and a case where it is embodied by one computer, hardware, and apparatus.

Figure 1:
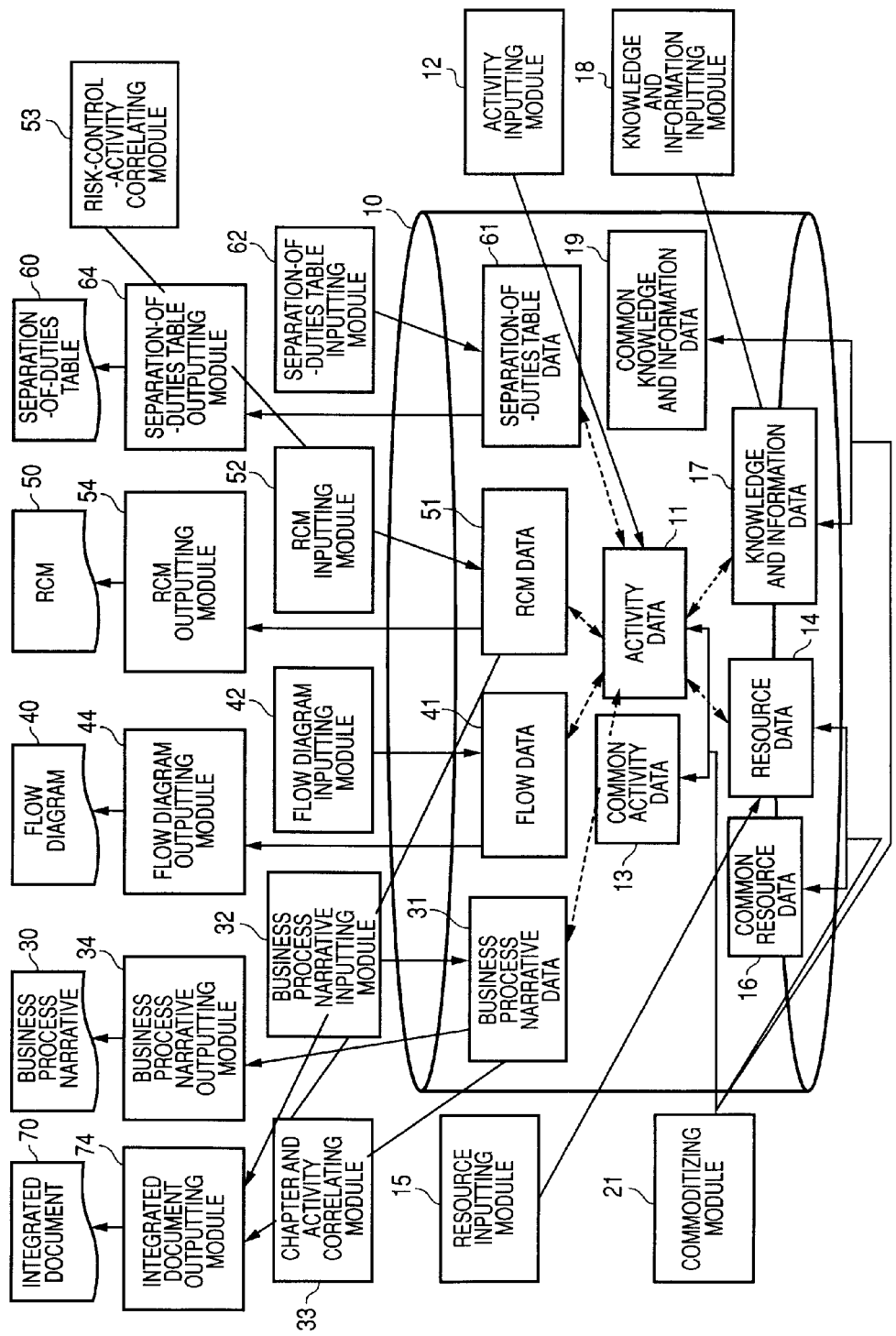
FIG. 1 is a block diagram illustrating a configuration of modules in an embodiment of the invention.

As shown in FIG. 1, activity data 11, common activity data 13, resource data 14, common resource data 16, knowledge and information data 17, common knowledge and information data 19, business process narrative data 31, flow diagram data 41, RCM data 51, and separation-of-duties table data 61 are stored in the business process element DB 10. These data may be managed by the use of different databases or by the use of a single database.

The activity data 11 is connected to the business process narrative data 31, the flow diagram data 41, the RCM data 51, the separation-of-duties table data 61, the resource data 14, the knowledge and information data 17, the common activity data 13, and the activity inputting module 12. The activity inputting module 12 is connected to the activity data 11. The common activity data 13 is connected to the activity data 11. The resource data 14 is connected to the common resource data 16, the activity data 11, and the resource inputting module 15. The resource inputting module 15 is connected to the resource data 14. The common resource data 16 is connected to the resource data 14. The knowledge and information data 17 is connected to the common knowledge and information data 19, the activity data 11, and the knowledge and information inputting module 18. The common knowledge and information data 19 is connected to the knowledge and information data 17. The knowledge and information inputting module 18 is connected to the knowledge and information data 17. The business process narrative data 31 is connected to the activity data 11, the business process narrative inputting module 32, the business process narrative outputting module 34, and the integrated document outputting module 74. The flow diagram data 41 is connected to the activity data 11, the flow diagram inputting module 42, and the flow diagram outputting module 44. The RCM data 51 is connected to the activity data 11, the RCM inputting module 52, the RCM outputting module 54, and the integrated document outputting module 74. The separation-of-duties table data 61 is connected to the activity data 11, the separation-of-duties inputting module 62, and the separation-of-duties outputting module 64.

A commoditizing module 21 connects the activity data 11 to the common activity data 13 and commoditizes data of the activity data 11 so as to be used by another person in charge. Data of the common activity data 13 is opened to another operator (person in charge) by the commoditizing. Similarly, the commoditizing module 21 connects the resource data 14 to the common resource data 16 and connects the knowledge and information data 17 to the common knowledge and information data 19. Accordingly, data of the resource data 14 and the knowledge and information data 17 are commoditized so as to be used by another person in charge. Data of the common resource data 16 and the common knowledge and information data 19 are opened to another operator (person in charge). The right of access to the data of the common activity data 13, the common resource data 16, and the common knowledge and information data 19 can be opened and copied by another operator. However, the writing to the common activity data 13, the common resource data 16, and the common knowledge and information data 19 can be executed by only an operator of the commoditizing module 21.

Modules for inputting data to the business process element DB 10 include a business process narrative inputting module 32, a flow diagram inputting module 42, an RCM inputting module 52, and a separation-of-duties inputting module 62. The business process narrative inputting module 32 is connected to business process narrative data 31 and a chapter and activity correlating module 33. The flow diagram inputting module 42 is connected to the flow diagram data 41. The RCM inputting module 52 is connected to the RCM data 51 and a risk-control-activity correlating module 53. The separation-of-business inputting module 62 is connected to the separation-of-duties data 61. The chapter and activity correlating module 33 is connected to the business process narrative inputting module 32. The risk-control-activity correlating module 53 is connected to the RCM inputting module 52.

Modules for outputting data from the business process element DB 10 include a business process narrative outputting module 34, a flow diagram outputting module 44, an RCM outputting module 54, a separation-of-duties outputting module 64, and an integrated document outputting module 74. The business process narrative outputting module 34 is connected to the business process narrative data 31 and outputs a business process narrative 30. The flow diagram outputting module 44 is connected to the flow diagram data 41 and outputs a flow diagram 40. The RCM outputting module 54 is connected to the RCM data 51 and outputs an RCM 50. The separation-of-duties outputting module 64 is connected to the separation-of-duties table data 61 and outputs a separation-of-duties table data 60. The integrated document outputting module 74 is connected to the business process narrative data 31 and the RCM data 51 and outputs an integrated document 70.

The activity data 11 serves as basic data for preparing the four basic documents (the business process narrative 30, the flow diagram 40, the RCM 50, and the separation-of-duties table 60) of the internal control. That is, the activity inputting module 12 receives and stores information on activities including activity names and activity contents in the activity data 11 by means of an operator (preparator of a document)'s input operation.

Relations between data in the business process element DB 10 will be described in detail with reference to FIG. 3.

Figure 3:
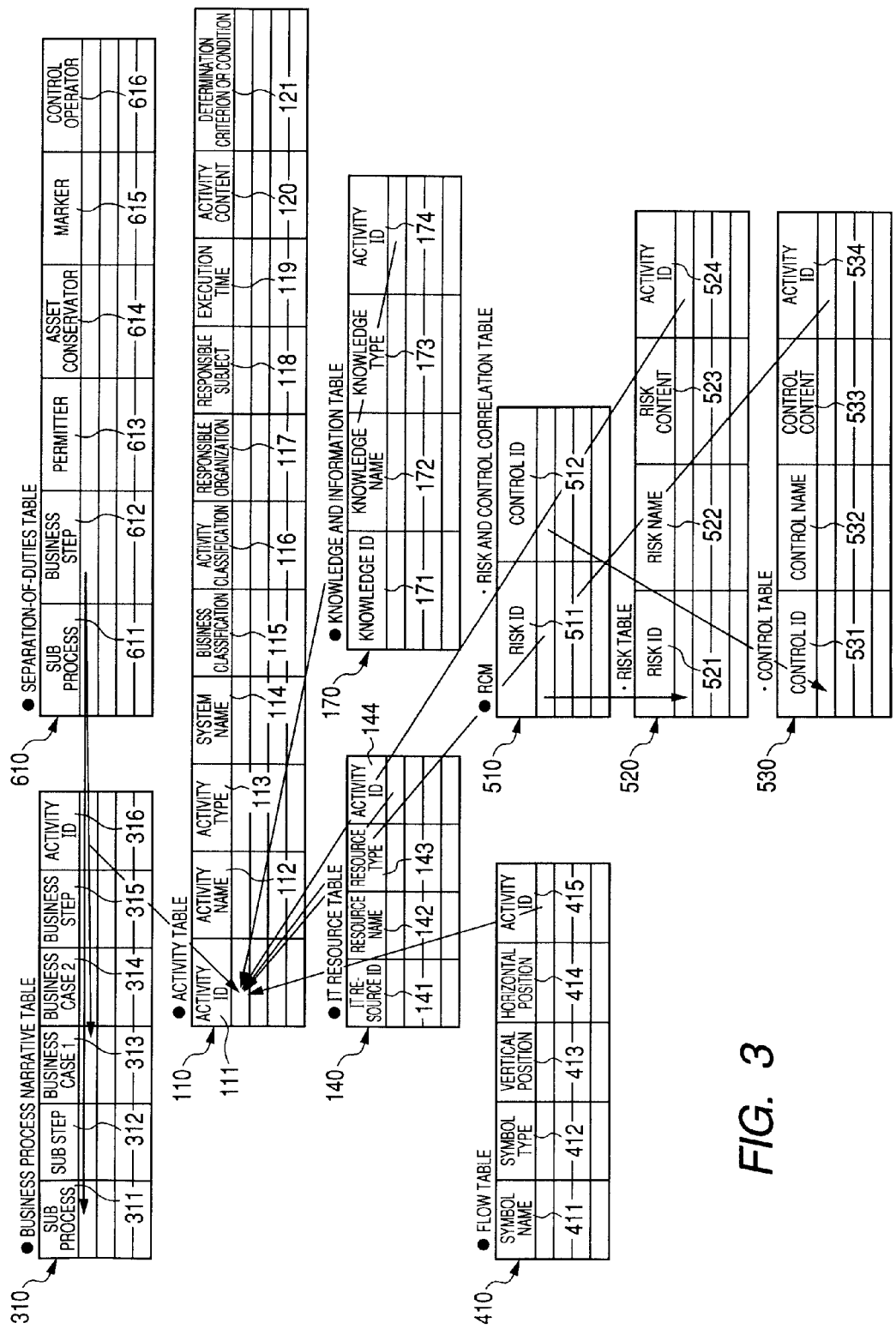
FIG. 3 is an explanatory diagram illustrating a relation between tables used in the embodiment of the invention.

FIG. 3 shows relations between an activity table 110, an IT resource table 140, a knowledge and information table 170, a business process narrative table 310, a separation-of-duties table 610, a flow table 410, an RCM 510, a risk table 520, and a control table 530. The columns of the tables are only examples and columns may be added thereto so as to store other information.

The activity table 110 corresponds to the activity data 11 of FIG. 1. The activity table 110 includes an activity ID column 111, an activity name column 112, an activity type column 113, a system name column 114, a business classification column 115, an activity classification column 116, a responsible organization column 117, a responsible subject column 118, an execution time column 119, an activity content column 120, and a determination criterion or condition column 121. The activity ID stored in the activity ID column 111 is an identifier for uniquely identifying an activity input by an operator. The activity ID is also used in an activity ID column 316 of the business process narrative table 310, an activity ID column 144 of the IT resource table 140, an activity ID column 174 of the knowledge and information table 170, an activity ID column 415 of the flow table 410, an activity ID column 524 of the risk table 520, and an activity ID column 534 of the control table 530 and the respective tables are correlated with the activity table 110. That is, since a basic unit of a business process is an activity, a configuration having such relations between the tables is constructed.

Accordingly, it is possible to search the tables for a corresponding activity. For example, when it is intended to search for an activity included in a sub process in the business process narrative table 310, it is possible to search for the activity name and the activity content corresponding to the activity ID by searching the activity ID column 111 of the activity table 110 on the basis of the activity ID stored in the activity ID column 316 corresponding to the sub process. On the contrary, it is also possible to search the items of the tables on the basis of the activity ID. For example, when it is intended to search for a risk corresponding to an activity ID, it is possible to search for the risk name and the risk content on the basis of the corresponding activity ID by searching the activity ID column 524 of the risk table 520 for the activity ID. Information stored in the determination criterion or condition column 121 from the activity name column 112 will be described with reference to FIG. 5.

The IT resource table 140 corresponds to the resource data 14 of FIG. 1. The IT resource table 140 includes an IT resource ID column 141, a resource name column 142, a resource type column 143, and an activity ID column 144. The activity ID stored in the activity ID column 144 is the same activity ID as being stored in the activity ID column 111 of the activity table 110 and correlates the IT resource table 140 with the activity table 110.

The knowledge and information table 170 corresponds to the knowledge and information data 17 of FIG. 1. The knowledge and information table 170 includes a knowledge ID column 171, a knowledge name column 172, a knowledge type column 173, and an activity ID column 174. The activity ID stored in the activity ID column 174 is the same activity ID as being stored in the activity ID column 111 of the activity table 110 and correlates the knowledge and information table 170 with the activity table 110.

The business process narrative table 310 corresponds to the business process narrative data 31 of FIG. 1. A business process narrative is prepared on the basis of the business process narrative table 310. The business process narrative table 310 includes a sub process column 311, a sub step column 312, a business case 1 column 313, a business case 2 column 314, a business step column 315, and an activity ID column 316. The activity ID stored in the activity ID column 316 is the same activity ID as being stored in the activity ID column 111 of the activity table 110 and correlates the business process narrative table 310 with the activity table 110.

Layers indicating the business process of the business process narrative are classified into 5 layer levels. That is, the leveling is performed by standardizing (fixing) the levels into 5 layers. By determining 5 layers of a sub process, a sub step, a business case 1, a business case 2, and a business step, the size (size when they are arranged in a single sub process) is made constant by even several preparators.

The sub process stored in the sub process column 311 is the highest layer of the 5 layers and is a business range when an organization in charge of a business is the same division or company.

The sub step stored in the sub step column 312 is a second layer and is a business range when a main person in charge is the same.

The business case 1 stored in the business case 1 column 313 and the business case 2 stored in the business case 2 column 314 are third and fourth layers, respectively, and are branched and described by conditions when plural business patterns exist in the same sub step. 2 layers of "business case 1" and "business case 2" can be described as the conditions.

The business step stored in the business step column 315 is a fifth layer, which is the lowest layer of 5 layers, and is a business unit corresponding to an activity. The business step is correlated with one activity. However, plural business steps may be correlated with one activity. In the correlation with the activity, the activity is correlated with only the "business step" as the lowest layer but not correlated with the other layers (sub process, sub step, business case 1, and business case 2).

The separation-of-duties table 610 corresponds to the separation-of-duties table data 61 of FIG. 1. The separation-of-duties table is prepared on the basis of the separation-of-duties table 610. The separation-of-duties table 610 includes a sub process column 611, a business step column 612, an acknowledger column 613, an asset conservator column 614, a marker column 615, and a control person column 616. The sub process stored in the sub process column 611 is the same sub process as being stored in the sub process column 311 of the business process narrative table 310 and correlates the separation-of-duties table 610 with the business process narrative table 310. Similarly, the business step stored in the business step column 612 is the same business step as being stored in the business step column 315 of the business process narrative table 310 and correlates the separation-of-duties table 610 with the business process narrative table 310. That is, the sub process and the business step of the separation-of-duties table are obtained by developing the sub process and the business step of the business process narrative and there is no disagreement between both.

Names or identifiers of persons in charge of acknowledgement, conservation, marking, and control are stored in from the acknowledger column 613 to the control person column 616.

The flow table 410 corresponds to the flow diagram data 41 of FIG. 1. The flow diagram is prepared on the basis of the flow table 410. The flow table 410 includes a symbol name column 411, a symbol type column 412, a vertical position column 413, a horizontal position column 414, and an activity ID column 415. The activity ID stored in the activity ID column 415 is the same activity ID as being stored in the activity ID column 111 of the activity table 110 and correlates the flow table 410 with the activity table 110.

The symbol name stored in the symbol name column 411 is a name of a symbol used in the flow diagram.

The symbol type stored in the symbol type column 412 is a type (such as determination, processing, input, and output) represented by the symbol.

The vertical position and the horizontal position stored in the vertical position column 413 and the horizontal position column 414 specify positions in the flow diagram.

The RCM 510, the risk table 520, and the control table 530 correspond to the RCM data 51 of FIG. 1. The RCM is prepared on the basis of the RCM 510, the risk table 520, and the control table 530. The RCM 510 includes a risk ID column 511 and a control ID column 512. The risk table 520 includes a risk ID column 521, a risk name column 522, a risk content column 523, and an activity ID column 524. The control table 530 includes a control ID column 531, a control name column 532, a control content column 533, and an activity ID column 534.

The activity ID stored in the activity ID column 524 of the risk table 520 is the same activity ID as being stored in the activity ID column 111 of the activity table 110 and correlates the risk table 520 with the activity table 110. The activity ID stored in the activity ID column 534 of the control table 530 is the same activity ID as being stored in the activity ID column 111 of the activity table 110 and correlates the control table 530 with the activity table 110.

The risk ID stored in the risk ID column 511 of the RCM 510 is an identifier for uniquely identifying a risk. The control ID stored in the control ID column 512 of the RCM 510 is an identifier for uniquely identifying a control.

The risk ID stored in the risk ID column 521 of the risk table 520 is the same risk ID as being stored in the risk ID column 511 of the RCM 510 and correlates the risk table 520 with the RCM 510. Similarly, the control ID stored in the control ID column 531 of the control table 530 is the same control ID as being stored in the control ID column 512 of the RCM 510 and correlates the control table 530 with the RCM 510.

The risk name stored in the risk name column 522 is a name of a risk.

The risk content stored in the risk content column 523 explains a content of a risk.

The control name stored in the control name column 532 is a name of a control.

The control content stored in the control content column 533 explains a content of a control.

Here, processes of the integrated document outputting module 74 will be described with reference to the tables shown in FIG. 3.

The integrated document outputting module 74 extracts an activity name in the activity name column 112, a responsible subject in the responsible subject column 118, and the activity content in the activity content column 120, which correspond to the activity ID, stored in the activity table 110 on the basis of the activity ID. The integrated document outputting module extracts a sub process in the sub process column 311, a sub step in the sub step column 312, a business case 1 in the business case 1 column 313, a business case 2 in the business case 2 column 314, and a business step in the business step column 315, which correspond to the activity ID, stored in the business process narrative table 310 on the basis of the activity ID. The integrated document outputting module extracts a risk name in the risk name column 522, which corresponds to the activity ID, stored in the risk table 520 on the basis of the activity ID. The integrated document outputting module extracts a control name in the control name column 532, which corresponds to the activity ID, stored in the control table 530 on the basis of the activity ID. Finally, the integrated document outputting module prepares an integrated document 70 which is an internal control document visually displaying the extracted activity name, responsible subject, activity content, sub process which is plural levels of layers indicating business processes, risk name, and control name.

The integrated document outputting module 74 extracts an activity name in the activity name column 112, a responsible subject in the responsible subject 118, and an activity content in the activity content column 120, which correspond to the activity ID, stored in the activity table 110 on the basis of the activity ID. The integrated document outputting module 74 extracts a sub process in the sub process column 311, a sub step in the sub step column 312, a business case 1 in the business case 1 column 313, a business case 2 in the business case 2 column 314, and a business step in the business step column 315, which correspond to the activity ID, stored in the business process narrative table 310 on the basis of the activity ID. The integrated document outputting module extracts a risk name in the risk name column 522, which corresponds to the activity ID, stored in the risk table 520 on the basis of the activity ID. The integrated document outputting module extracts a risk ID in the risk ID column 521, which corresponds to the activity ID, stored in the risk table 520, extracts a control ID in the control ID column 512 stored in the RCM 510 on the basis of the risk ID, and extracts a control name in the control name column 532 stored in the control table 530 on the basis of the control ID. Finally, the integrated document outputting module prepares an integrated document 70 which is an internal control document visually displaying the extracted activity name, responsible subject, activity content, sub processes which are plural levels of layers indicating business processes, risk name, and control name corresponding to the risk.

Figure 4:
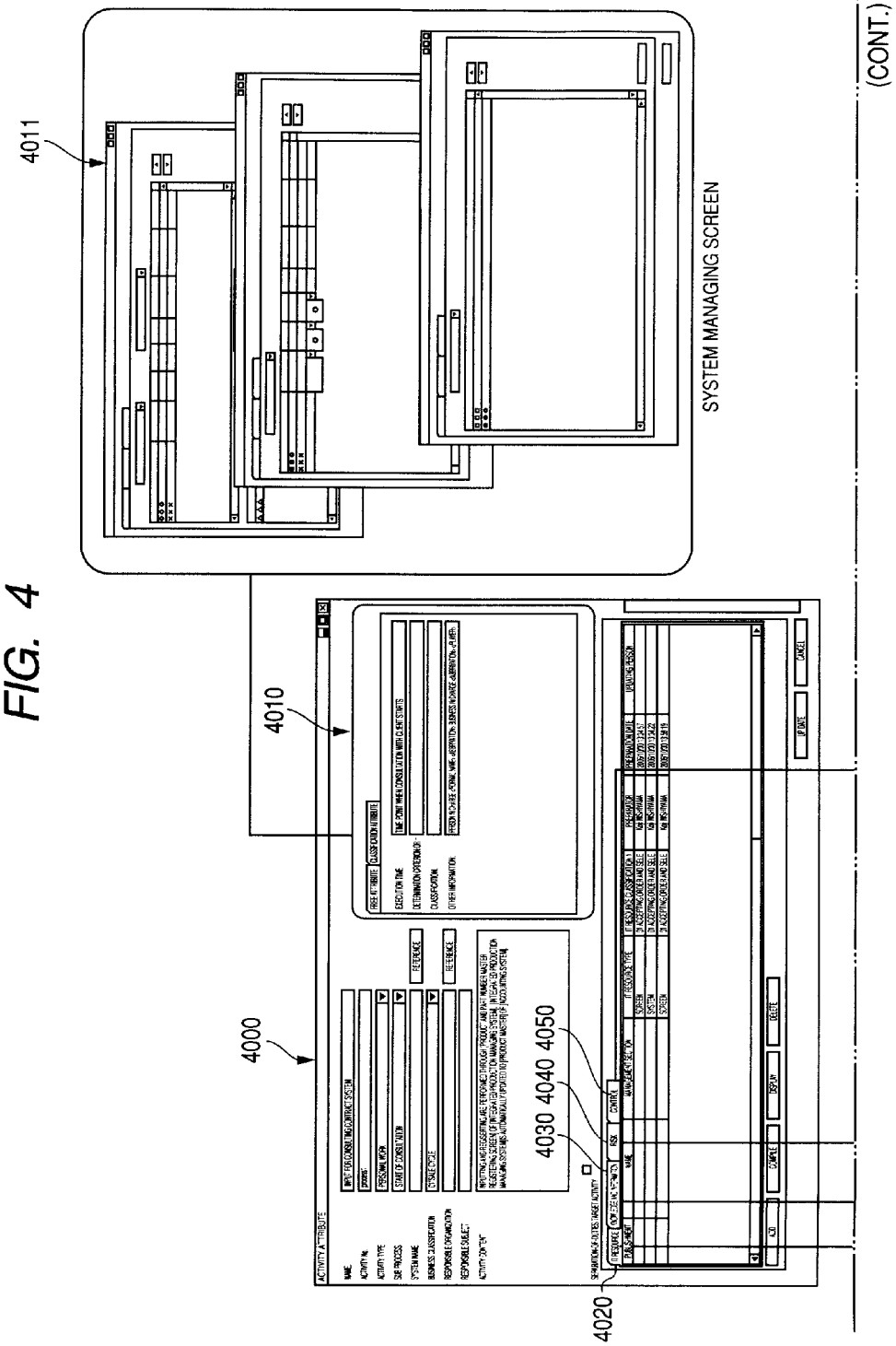
FIG. 4 is an explanatory diagram illustrating a relation between inputting screens displayed in the embodiment of the invention.

Relations between displayed inputting screens will be described with reference to FIG. 4.

An IT resource information inputting screen 4021, a knowledge and information inputting screen 4031, a risk inputting screen 4041, and a control inputting screen 4051 can be displayed from an activity attribute inputting screen 4000. Information input through a system managing screen 4011 is displayed in a system managing display area 4010 in the activity attribute inputting screen 4000.

Figure 5:
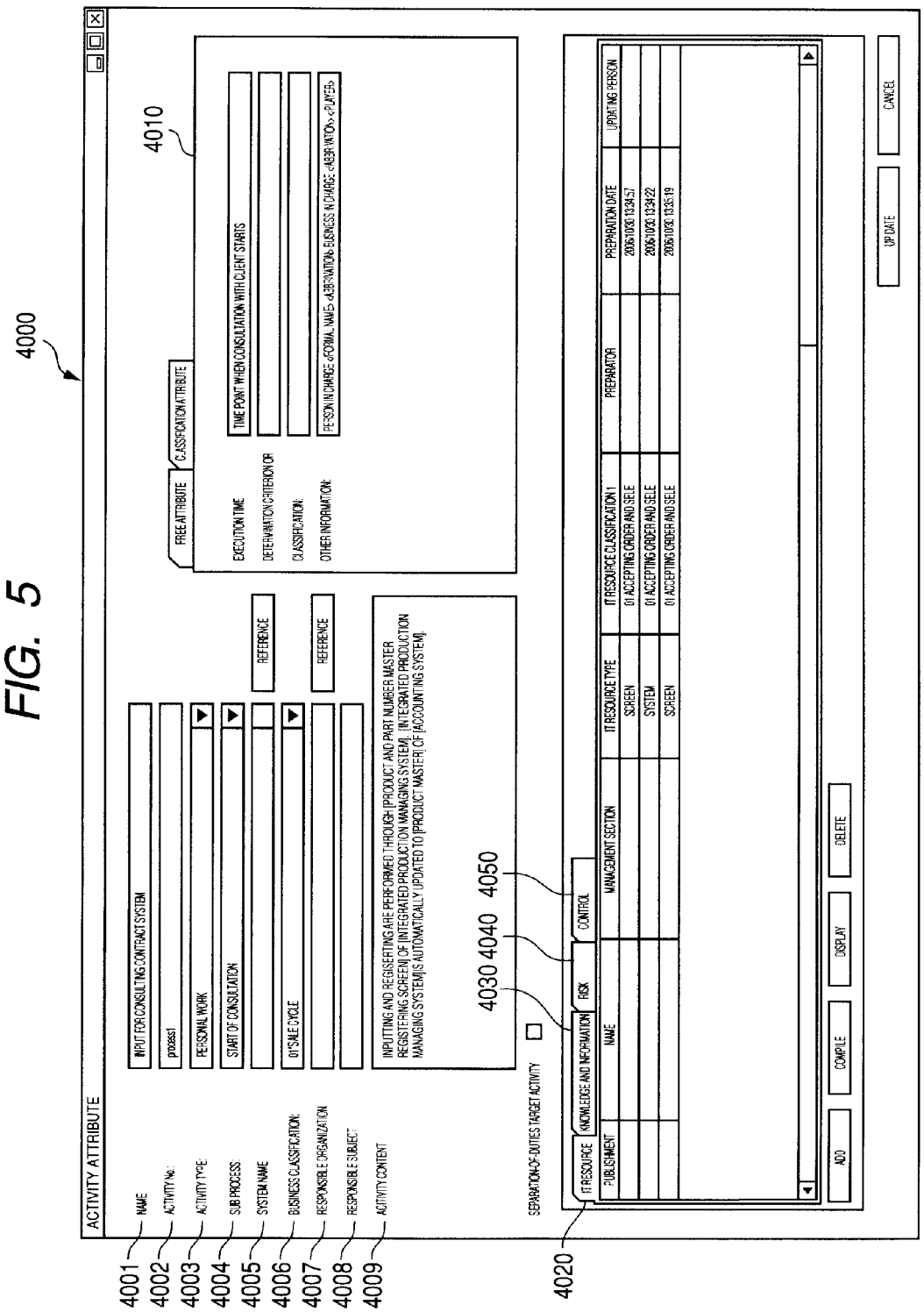
FIG. 5 is an explanatory diagram illustrating a screen for inputting an activity attribute.

The activity attribute inputting screen 4000 will be described with reference to FIG. 5.

A display area having an IT resource tab 4020, a knowledge and information tab 4030, a risk tab 4040, and a control tab 4050 is disposed in the lower portion of the activity attribute inputting screen 4000. When the IT resource tab 4020, the knowledge and information tab 4030, the risk tab 4040, and the control tab 4050 are selected by means of an operator's operation, the IT resource information inputting screen 4021, the knowledge and information inputting screen 4031, the risk inputting screen 4041, and the control inputting screen 4051 are displayed, respectively.

The IT resource information inputting screen 4021 is a screen used to input information on an IT resource and is a screen for inputting a name of the IT resource, an abbreviation, management division, type of the IT resource, system name, classification of the IT resource, and content.

The knowledge and information inputting screen 4031 is a screen used to input knowledge and information on a business and a screen for inputting a knowledge, an information name, a document having the knowledge and information, a document name, a data type of the document, a classification of the knowledge and information, and a content.

The risk inputting screen 4041 is a screen used to input information on a risk, that is, a screen for inputting a risk number, an assertion, a risk content, a risk test, and a risk classification.

The control inputting screen 4051 is a screen used to input information on a control, that is, a screen for inputting a control number, a control content, a control type, a control frequency, a control execution evidence, a responsible person for the control execution, a dependent system/database, and a purpose of information processing control.

An activity attribute inputting screen will be described with reference to FIG. 5.

The activity attribute inputting screen 4000 includes a name column 4001, an activity number column 4002, an activity type column 4003, a sub process column 4004, a system name column 4005, a business classification column 4006, a responsible organization column 4007, a responsible subject column 4008, an information inputting area of an activity content column 4009 which are located in the left upper side, a system management display area 4010 which is located in the right upper side, and an information display area ranging from the IT resource tab 4020 to the control tab 4050 which are located in the lower side.

The name column 4001 is a column for inputting an activity name (for example, "input to a consultation and contract system") and the input content is stored in the activity name column 112 of the activity table 110.

The activity type column 4003 is a column for inputting an activity type (for example, "personal work") and the input content is stored in the activity type column 113 of the activity table 110.

The sub process column 4004 is a column for inputting a sub process (for example, "consultation start") and the input content is stored in the sub process column 311 of the business process narrative table 310. Here, when the sub process is input, the system name column 4005, the business classification column 4006, the responsible organization column 4007, and the responsible subject 4008 are controlled to be prevented from the input thereto.

The system name column 4005 is a column for inputting a system name and the input content is stored in the system name column 114 of the activity table 110.

The business classification column 4006 is a column for inputting a business classification (for example, "sale cycle") and the input content is stored in the business classification column 115 of the activity table 110.

The responsible organization column 4007 is a column for inputting a responsible organization and the input content is stored in the responsible organization column 117 of the activity table 110.

The responsible subject column 4008 is a column for inputting a responsible subject and the input content is stored in the responsible subject 118 of the activity table 110.

The activity content column 4009 is a column for inputting an activity content and the input content is stored in the activity content column 120 of the activity table 110.

That is, in addition to the contents of a business, there are columns for inputting "responsible subject", "execution time", "activity content", and "determination criterion or condition" (a condition at the time of executing an activity) as input details of an activity, whereby the activity item is formalized in a 5W1H manner.

Figure 6:
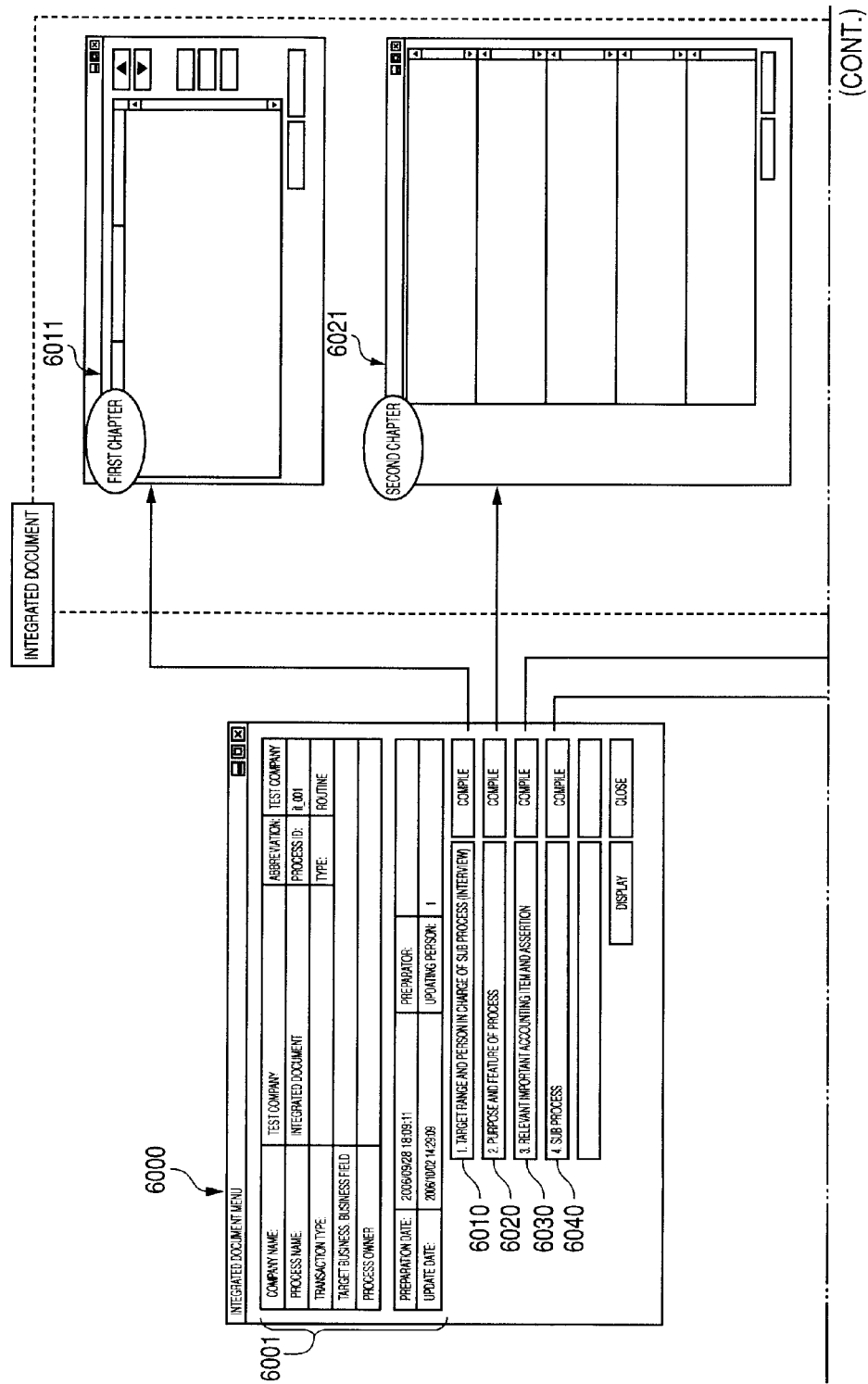
FIG. 6 is an explanatory diagram illustrating a relation between screens for displaying an integrated document.

Relations between integrated document display screens will be described with reference to FIG. 6. The integrated document is an internal control document for visually displaying at least an activity name, a responsible subject, an activity content, plural levels of layers indicating business processes, a risk name, and a control name. For example, the integrated document is obtained by integrating three documents of the business process narrative, the RCM, and the separation-of-duties table among four basic documents.

An integrated document menu screen 6000 is a screen for editing and displaying an integrated document and includes columns for editing and displaying item columns 6001 located in the upper side and first to fourth chapters of an integrated document located in the lower side.

A company name, a process name, a transaction type, a target business and business field, a process owner, a preparation date and time, an update date and time, and a preparatory, which are bibliographical items of the integrated document, are displayed in the item columns 6001 of the integrated document menu screen 6000.

When the first editing column 6010 is selected by an operator's operation, a first chapter inputting screen 6011 is displayed. Similarly, when the second editing column 6020, the third editing column 6030, and the fourth editing column 6040 are selected by the operator's operation, a second chapter inputting screen 6021, a third chapter inputting screen 6031, and a fourth chapter inputting screen 6041 are displayed, respectively. The fourth chapter inputting screen 6041 will be described with reference to FIG. 7.

Figure 7:
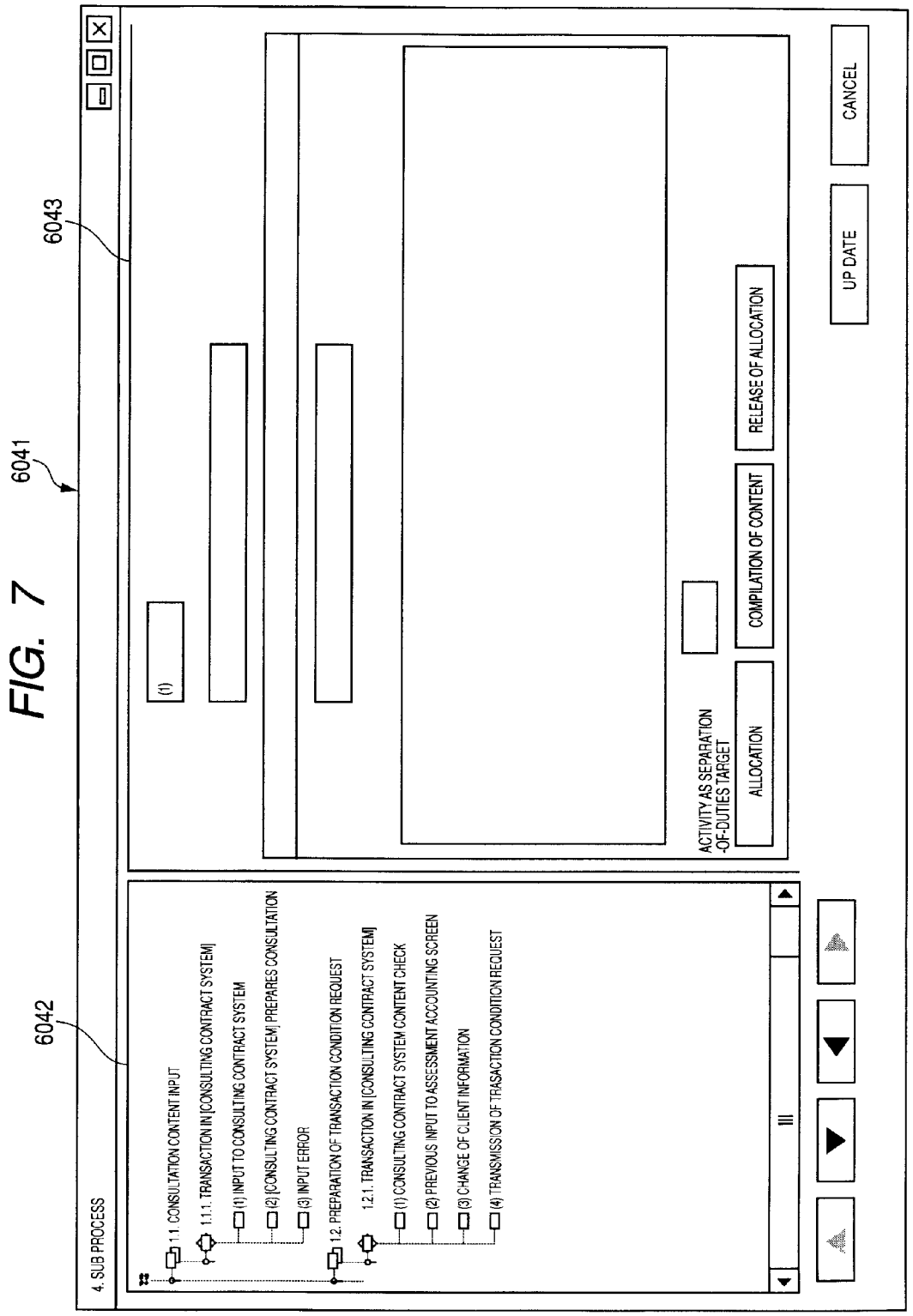
FIG. 7 is an explanatory diagram illustrating a screen for displaying an integrated document.

An example of an integrated document displaying screen will be described with reference to FIG. 7.

The fourth chapter inputting screen 6041 includes a chapter display area 6042 located in the left and an item inputting area 6043 located in the right.

The chapter display area 6042 displays a configuration of the fourth chapter (title and relation between chapters or sections) of the integrated document hierarchically constructed.

The item inputting area 6043 displays contents of the title, when the title displayed in the chapter display area 6042 is selected by the operator's operation. For example, paragraph numbers, paragraph names, activity names, and activity contents are displayed.

An example of an output of the integrated document will be described with reference to FIG. 8.

In the example shown in FIG. 8, the integrated document is displayed in the form of a business process narrative. FIGS. 8(A), 8(B), 8(C), and 8(D) show parts divided from one integrated document. FIG. 8(A) shows bibliographical items of the integrated document, a target range of the first chapter, and a person in charge of the sub process. FIG. 8(B) shows purposes and features of processes of the second chapter. FIG. 8(C) shows important accounts and assertions associated with the third chapter. FIG. 8(D) shows a sub process.

An example of an output of the integrated document will be described with reference to FIG. 9.

In the example shown in FIG. 9, the integrated document is displayed in the form of a table. The same contents as shown in FIG. 8 can be displayed in the form of a table. FIGS. 9(A), 9(B), and 9(C) show parts divided from one integrated document. FIG. 9(A) shows details of a business process narrative (sub process, sub step, business case 1, business case 2, responsible subject, participants, content). FIG. 9(B) shows details of an RCM (assertion, risk and control number, recognized risk, and recognized control). FIG. 9(C) shows details of a work through (evidence and procedure).

One line is formed every activity in the example shown in FIG. 9. That is, an activity name, a responsible subject, an activity content, plural levels of layers indicating business processes, a risk name, and a control name are visually displayed to correspond to an activity.

The information on internal control can be expressed in one integrated document by displaying in parallel a work through ledger sheet for a maintenance test, a test ledger diagram for an operation test, a business process narrative, an RCM.

A display screen of a business flow diagram 40 created by the flow diagram outputting module 44 will be described with reference to FIG. 10.

Figure 10A:
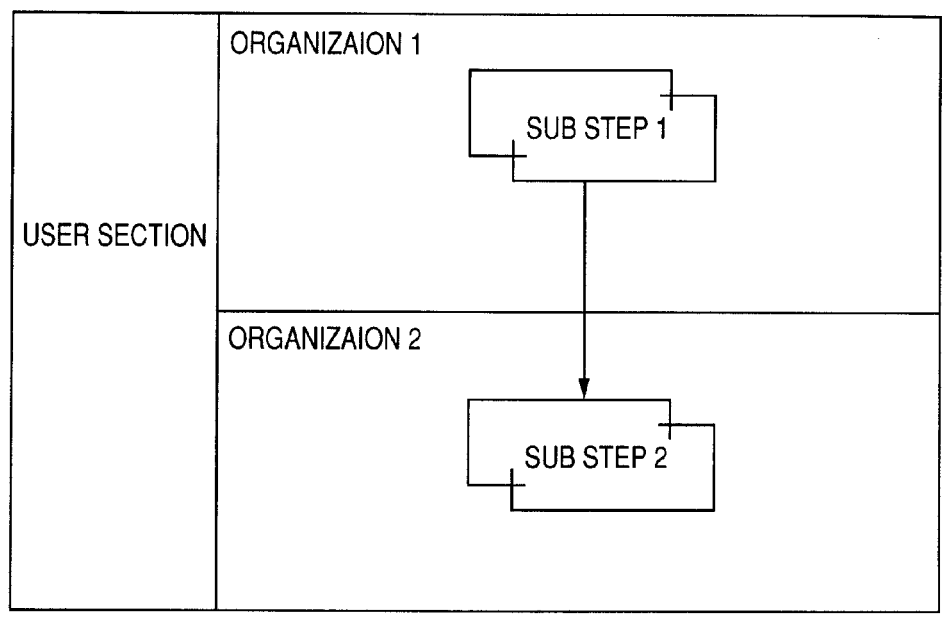
FIG. 10 is an explanatory diagram illustrating a display screen of a business flow diagram.
Figure 10B:
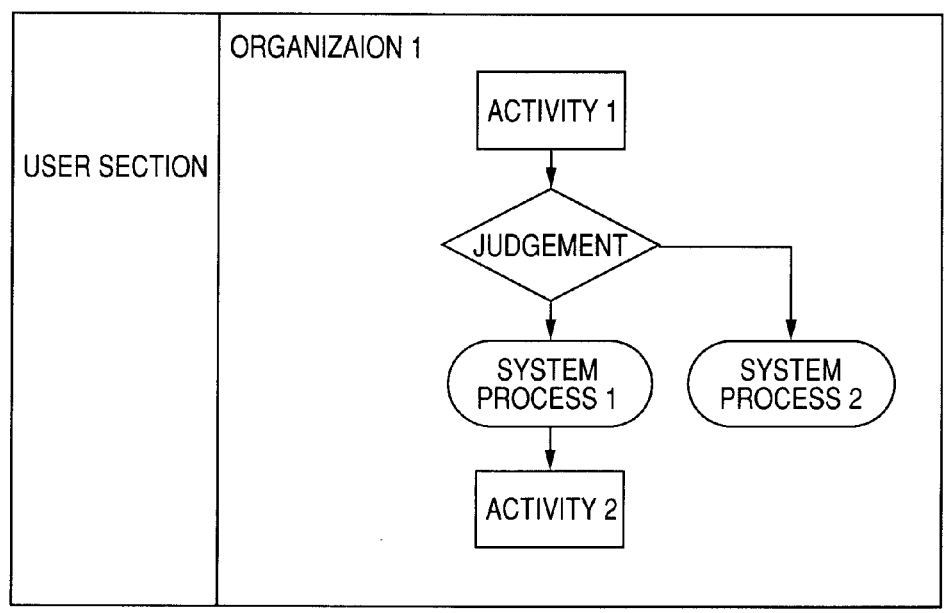

The flow diagram outputting module 44 creates a flow diagram 40 by the use of the flow diagram data 41 (flow table 410 of FIG. 3), but displays a large number of symbols by displaying symbols to correspond to the activities, as shown in FIG. 10(B), thereby making the flow diagram 40 complicated.

However, as described above, since the structure is standardized into 5 layers, it is possible to create a flow diagram 40 corresponding to a sub step and a display example thereof is shown in FIG. 10(A).

That is, since the sub step is in a business range including plural activities, the plural activities can be marked representatively by a single symbol. As shown in FIG. 10(A), by allowing the symbols of the sub steps to be different from the symbols of the activities, it is possible to determine whether it is a flow diagram 40 of a sub step or a flow diagram of an activity.

When a symbol of sub step 1 in FIG. 10(A) is selected by an operator's operation, a flow diagram 40 (FIG. 10(B)) of activities included in the symbol (sub step) is displayed. This is because the flow diagram outputting module 44 extracts an activity corresponding to the selected sub step by the use of the business process narrative data 31 (business process narrative table 310) and the activity data 11 (activity table 110) and displays the extracted activities by the use of data of the flow diagram data 41 corresponding to the extracted activity.

That is, an activity flow table storing a symbol name and information on a position of the symbol is provided to correspond to the sub step and a sub step flow table storing a symbol name and information on a position of the symbol is provided to correspond to the sub step. Accordingly, the flow diagram output module 44 displays the sub step flow diagram 40 shown in FIG. 10(A) on the basis of the sub step flow table. When a symbol in the sub step flow diagram 40 is selected by an operator's operation, the activity flow diagram 40 shown in FIG. 10(B) is displayed on the basis of the symbol name and the information on a position of the symbol stored in the activity flow table corresponding to the symbol.

Hereinafter, specific data in the above-mentioned embodiment will be described with reference to FIGS. 11 to 19.

A specific example of a relation between tables in the business process element DB 10 will be described with reference to FIG. 11. This specific example corresponds to FIG. 3.

For example, an activity in the activity table 110 is expressed by "FOR TEMPLATE 110-1-1" in the activity ID column 111, "Production Start proposal" in the activity name column 112, "Personal Work" in the activity type column 113, "Nil" in the system name column 114, "sale cycle" in the business classification column 115, "04-sale" in the activity classification 116, "development division" in the responsible organization 117, "person in charge of program" in the responsible subject 118, "Nil" in the execution time column 119, and "inform a relevant division (guarantee of quantity G, innovation of process G, management of plant G) of information such as product code and BOM" in the activity content 120. "Nil" indicates a blank (no correspondence, not determined)

For example, one sub step in the business process narrative table 310 is expressed by "selection and registration/update of new product source" in the sub process column 311, "production start proposal" in the sub step column 312, "Nil" in the business case 1 column 313, "Nil" in the business case 2 column 314, "production start proposal" in the business step column 315, and "FOR TEMPLATE 110-1-1" in the activity ID column 316.

For example, one business step in the separation-of-duties table 610 is expressed by "selection and registration/update of new product source" in the sub process column 611, "production start proposal" in the sub step column 612, and "person in charge of program" in the marker column 615.

For example, one IT resource in the IT resource table 140 is expressed by "IT-000001" in the IT resource ID column 141, "product part number master registering screen" in the resource name column 142, "screen" in the resource type column 143, and "FOR TEMPLATE 110-1-2" in the activity ID column 144.

For example, one knowledge in the knowledge and information table 170 is expressed by "KN-000001" in the knowledge ID column 171, "new transaction start request" in the knowledge name column 172, "request" in the knowledge type column 173, and "FOR TEMPLATE 110-1-5" in the activity ID column 174.

For example, one symbol in the flow table 410 is expressed by "production start proposal" in the symbol name column 411, "activity" in the symbol type 412, "5" in the vertical position column 413, "5" in the horizontal position column 414, and "FOR TEMPLATE 110-1-1" in the activity ID column 415.

For example, correspondence between one risk and one control in a risk and control relation table 510 is expressed by "R0001" in the risk ID column 511 and "C0001" in the control ID column 512.

For example, one risk in the risk table 520 is expressed by "R0001" in the risk ID column 521, "imaginary vendor/bad business condition, there is a danger to register a trade with a vendor not having quality guaranteeing ability" in the activity ID column 523, and "FOR TEMPLATE 110-1-5" in the activity ID column 524.

For example, on control in the control table 530 is expressed by "C001" in the control ID column 531, "person in charge of buyer in procurement division make a credit inspection by the use of an external third party and estimates the credit on the basis of estimation criterion" in the activity ID column 533, and "FOR TEMPLATE 110-1-3" in the activity ID column 534.

The activity ID column 111 of the activity table 110 is correlated with the activity ID column 316 of the business process narrative table 310, the activity ID column 144 of the IT resource table 140, the activity ID column 174 of the knowledge information table 170, the activity ID column 415 of the flow table 410, the control ID column 512 of the risk and control relation table 510, the activity ID column 524 of the risk table 520, and the activity ID column 534 of the control table 530.

A specific example of a relation between inputting screens will be described with reference to FIG. 12. This specific example corresponds to FIG. 4.

The activity attribute inputting screen 4000 shown in FIG. 12 will be described with reference to FIG. 5.

Figure 11:
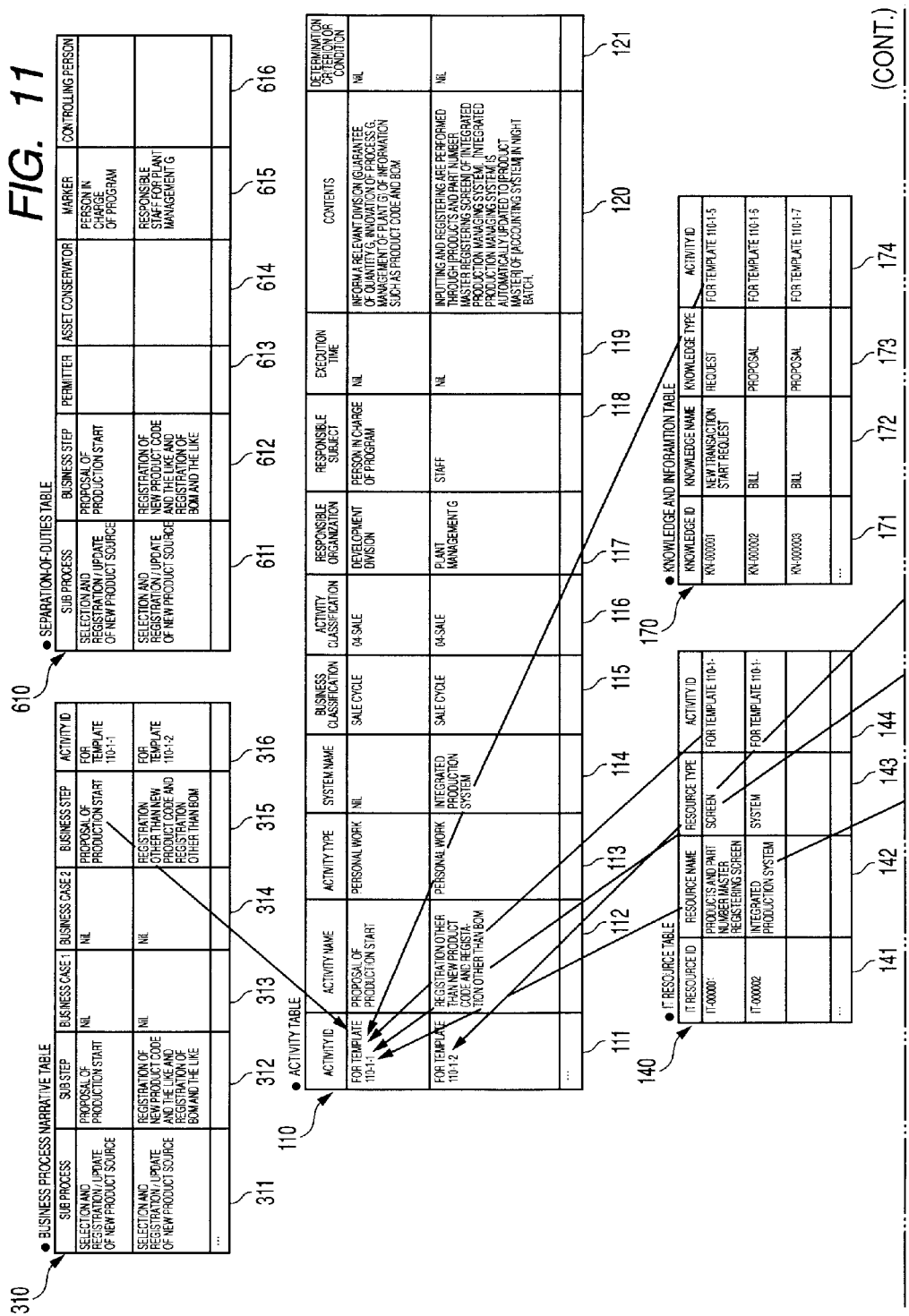
FIG. 11 is an explanatory diagram illustrating a specific example of a relation between tables.
Figure 12:
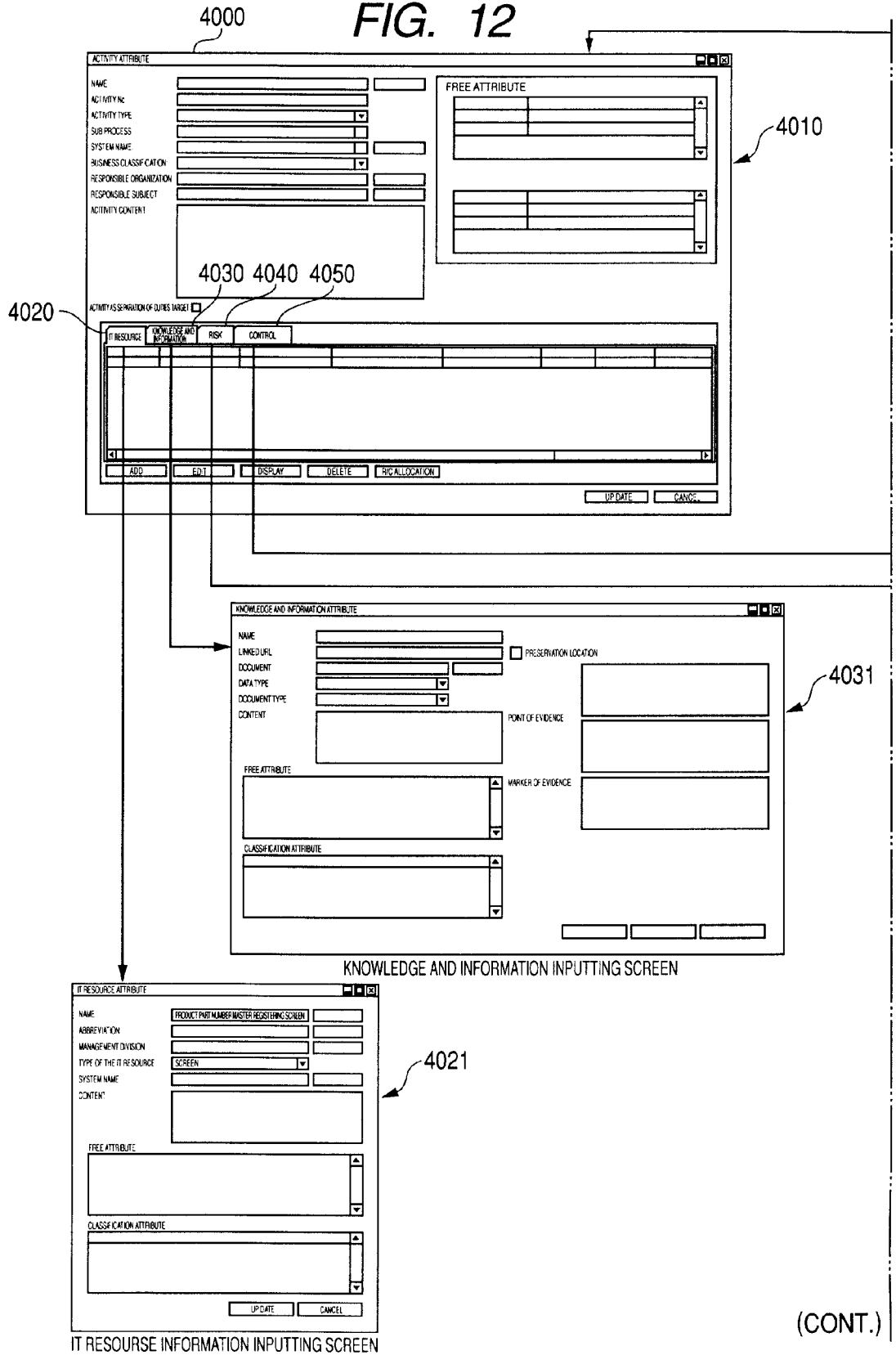
FIG. 12 is an explanatory diagram illustrating a specific example of a relation between inputting screens.

The IT resource information inputting screen 4021 of FIG. 12 shows a state where the IT resource "IT-000001" in the first line of the IT resource table 140 shown in FIG. 11 is input. The IT resource name is "product part number master registering screen" (corresponding to the resource name column 142 shown in FIG. 11) and the IT resource type is "resource" (corresponding to the resource type column 143 shown in FIG. 11).

The knowledge and information inputting screen 4031 of FIG. 12 shows a state where the knowledge and information "KN-000001" in the first line of the knowledge and information table 170 shown in FIG. 11 is input. The knowledge and information name is "new transaction start request" (corresponding to the knowledge name column 172 shown in FIG. 11) and the document type is "request" (corresponding to the knowledge type column 173 shown in FIG. 11).

Figure 13:
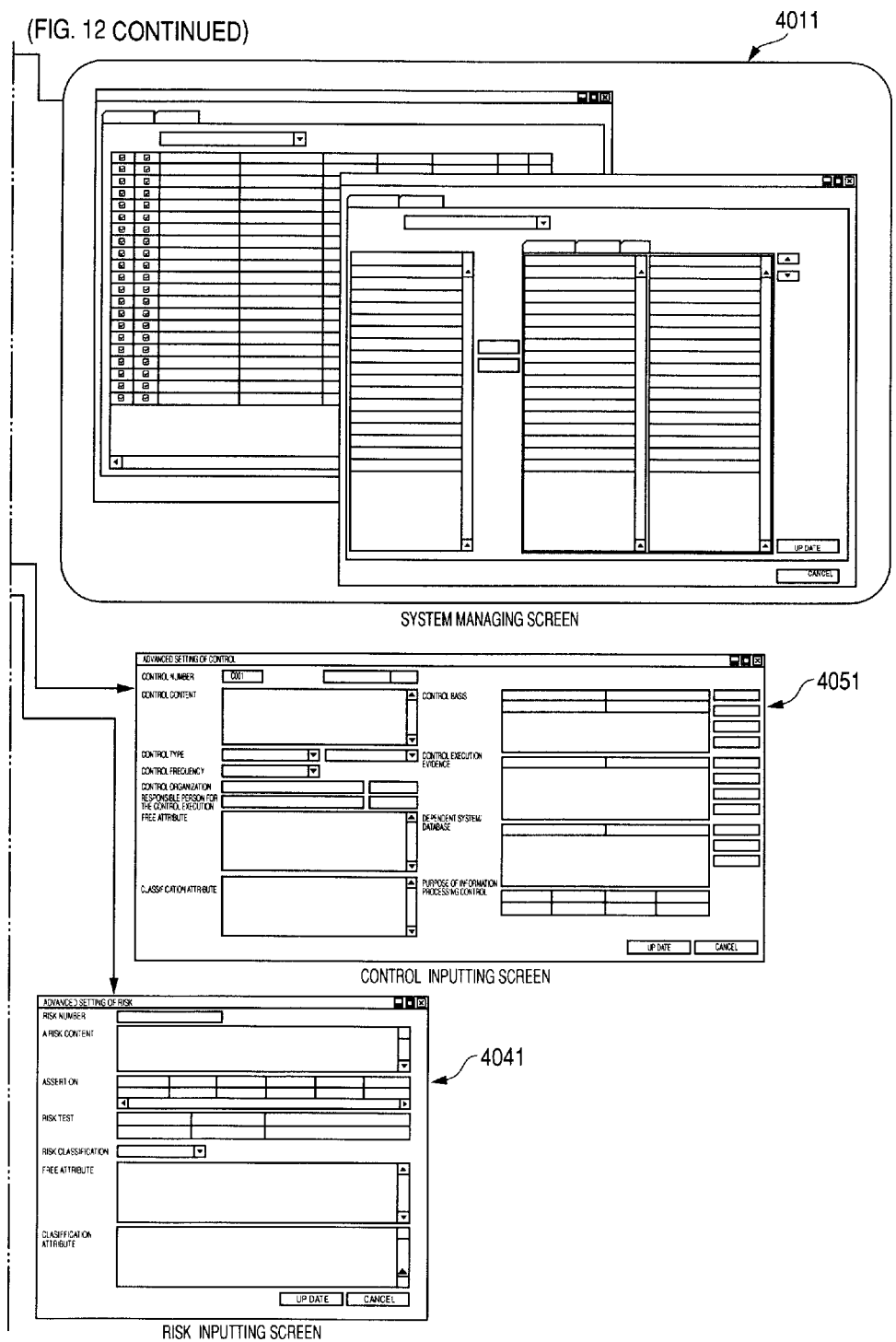
FIG. 13 is an explanatory diagram illustrating a specific example of a risk and control matrix.

A specific example of the risk and control matrix 1300 will be described with reference to FIG. 13.

The risk and control matrix 1300 displays a risk and control every sub process. This is created on the basis of the business process narrative table 310, the activity table 110, the risk and control relation table 510, the risk table 520, and the control table 530 shown in FIG. 11. That is, the risk and control matrix is created by extracting corresponding elements from the risk table 520 and the control table 530 by the use of the risk ID column 511 and the control ID column 512 of the risk and control relation table 510, extracting corresponding elements in the activity table 110 from the activity ID column 523 and the activity ID column 533, and extracting the corresponding sub process from the business process narrative table 310 correlated with the activity ID column 111.

The risk and control matrix 1300 includes a number column 1301, a sub process column 1302, a risk column 1310, and a control column 1350.

The risk column 1310 includes a risk-occurring activity name column 1311, an assertion column 1320, a risk (check item) column 1330, a risk estimation column 1340, and a risk classification column 1312.

The assertion column 1320 includes a reality column 1321, a completeness column 1322, a rights and duties column 1323, a test column 1324, a period and allocation column 1325, and a display column 1326.

The risk (check item) column 1330 includes a risk number column 1331 and a risk content column 1332.

The risk estimation column 1340 includes an effect degree column 1341, an occurrence probability column 1342, and an effect degree×occurrence probability column 1343.

The control column 1350 includes a control target activity name column 1351, a control content column 1360, a control type column 1370, a control frequency column 1352, a control basis column 1353, a control execution evidence column 1354, a control execution manager column 1355, a dependent system/database 1356, and an information process control purpose column 1380.

The control content column 1360 includes a control number column 1361, a key control column 1362, and a control situation column 1363.

The control type column 1370 includes a system column 1371, a manual column 1372, an IT-dependent manual column 1373, a preventive column 1374, and a discoverable column 1375.

The information processing control purpose column 1380 includes a completeness column 1381, an accuracy column 1382, a validness column 1383, and a maintenance column 1384.

For example, in a risk and control set of "selection and registration/update of new product source" as the subprocess column 1302, the risk-occurring activity name column 1311 is "bill of product source", and the assertion column 1320 has the reality column 1321, the completeness column 1322, and the rights and duties column 1323. The risk number column 1331 is "R001", the risk content column 1332 is "imaginary vendor/bad business condition, there is a danger to register a trade with a vendor not having quality guaranteeing ability", the occurrence probability column 1342 of the risk test column 1340 is "high", the risk classification column 1312 is "financial", the control target activity name column 1351 is "credit inspection", the control number column 1361 is "C001", and the control situation column 1363 is "person in charge of buyer in procurement division make a credit inspection by the use of an external third party and estimates the credit on the basis of estimation criterion". The control type column 1370 has the manual column 1372 and the preventive column 1374. The control frequency column 1352 is "high", the control basis column 1353 is "control of procuring business operation" and the control execution manager column 1355 is "OO center procuring manager."

Figure 14:
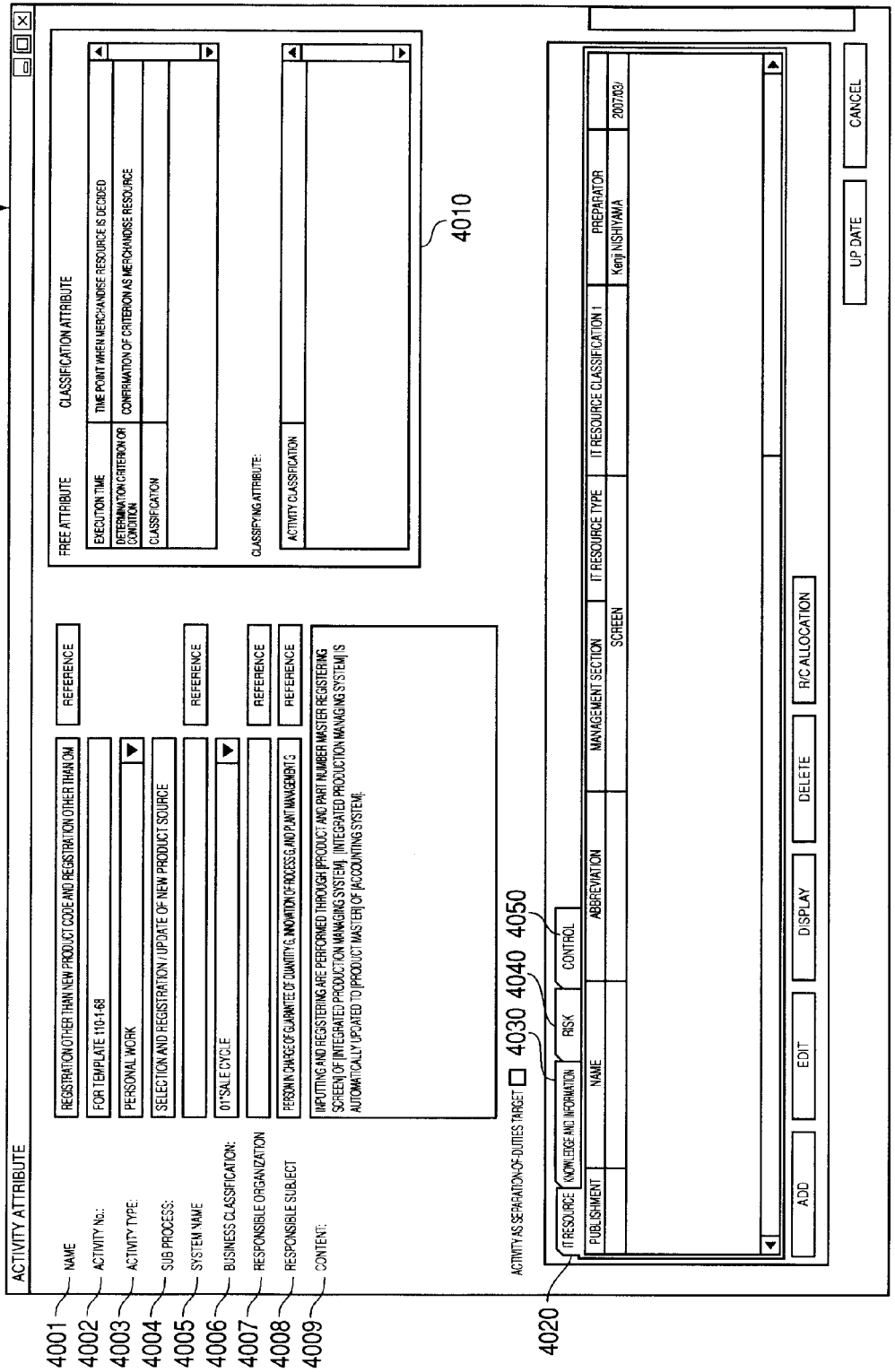
FIG. 14 is an explanatory diagram specifically illustrating a specific example of a screen for inputting an activity attribute.

A specific example of the activity attribute inputting screen will be described with reference to FIG. 14. This specific example corresponds to FIG. 5.

The activity attribute inputting screen 4000 includes a name column 4001, an activity number column 4002, an activity type column 4003, a sub process column 4004, a system name column 4005, a business classification column 4006, a responsible organization column 4007, a responsible subject column 4008, an activity content column 4009, a system management display area 4010, an IT resource 4020, a knowledge and information 4030, a risk 4040, and an information display area of a control 4050.

The activity attribute inputting screen 4000 shown in FIG. 12 shows a state where the activity attribute of "FOR TEMPLATE 110-1-2" in the second line of the activity table 110 shown in FIG. 11 is input.

For example, as a display example, the name column 4001 is "registration of new product code and the like/registration of BOM and the like" (corresponding to the activity name column 112 shown in FIG. 11), the activity number column 4002 is "FOR TEMPLATE 110-1-2" (corresponding to the activity ID column 111 shown in FIG. 11), the activity type column 4003 is "personal work" (corresponding to the activity type column 113 shown in FIG. 11), the sub process column 4004 is "selection and registration/update of new product source" (corresponding to the sub process column 311 shown in FIG. 11), the system name column 4005 is blank (corresponding to the system name column 114 shown in FIG. 11), the business classification column 4006 is "01+ sale cycle" (corresponding to the business classification column 115 shown in FIG. 11), a responsible organization column 4007 is blank, the responsible subject 4008 is "guarantee of quantity G, innovation of process G, management of plant G" (corresponding to the responsible subject column 118 shown in FIG. 11), the activity content column 4009 is "A registration screen of product/part number master of the integrated production management system is input and registered. It is automatically updated from the integrated production management system to the product master of an accounting system in a night batch" (corresponding to the activity content column 120 shown in FIG. 11).

A specific example of a relation between integrated document displaying screens will be described with reference to FIGS. 15 and 16. This specific example corresponds to FIGS. 6 and 7.

The integrated document menu screen 6000 displays the item column 6001 including a company name, a process name, a process ID, a transaction type, target business/business field, process/owner, a preparation date and time, an update date and time, which are bibliographical items of the integrated document, titles of the chapters serving as a content of the integrated document ("1. Target Range and Person in Charge of Sub Process (Interview)", "2. Purpose and Feature of Process", "3. Important Account Item and Assertion", "4. Sub Process", and "5. Review of Used information system"), and buttons for instructing to display and edit details of the chapters.

Figure 16:
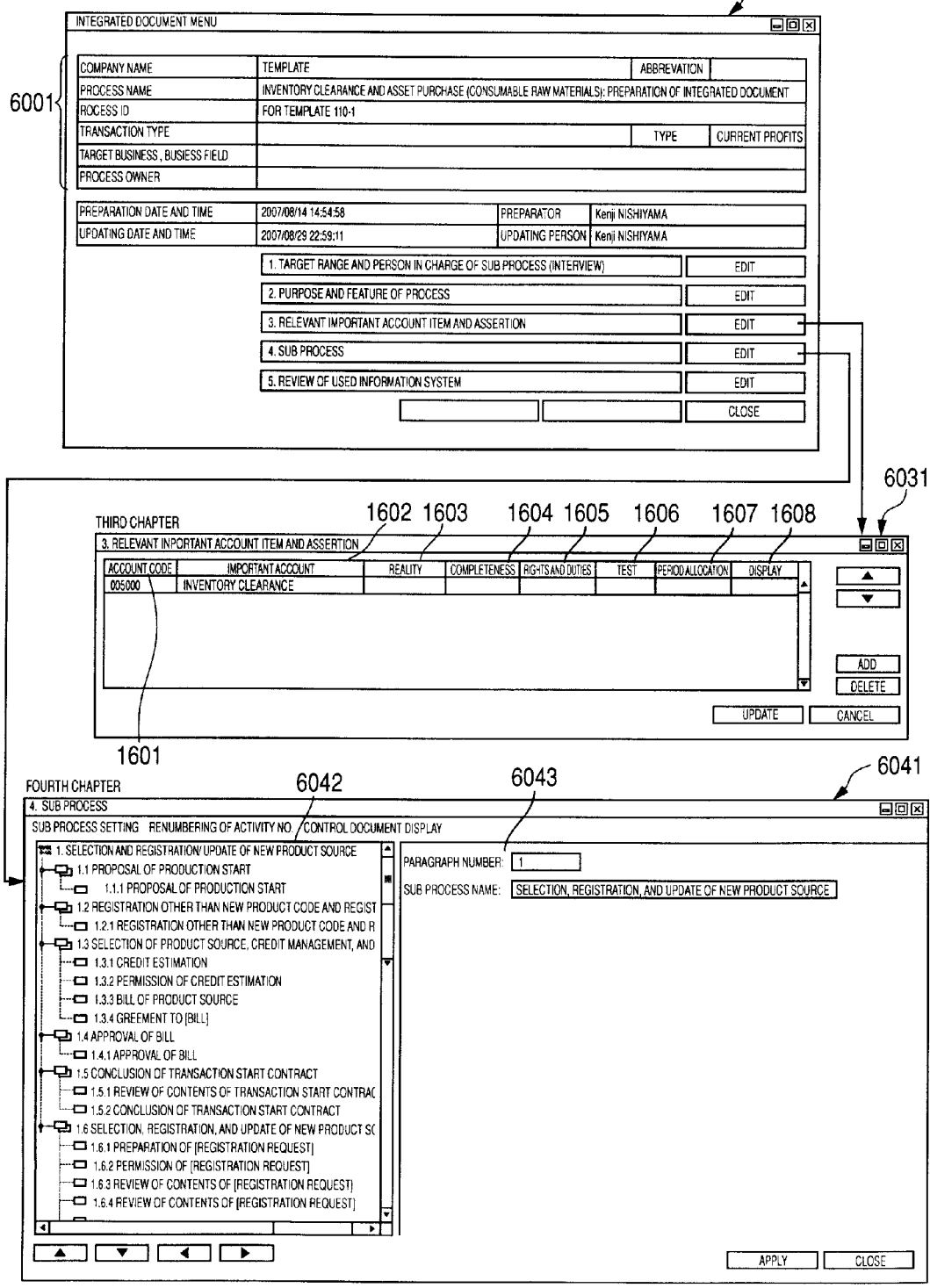
FIG. 16 is an explanatory diagram specifically illustrating a specific example of a screen for displaying an integrated document.

FIGS. 15 and 16 show an integrated document which includes a company name of "Template", a process name of "Inventory clearance/asset purchase (consumable goods raw material): integrated document format", and a process ID of "FOR TEMPLATE 110-1".

The first chapter inputting screen 6011 of FIG. 15 displays "1. Target Range and Person in Charge of Sub Process (Interview)" and includes a number column 1501, a target sub process column 1502, a hearing part column 1503, a hearing responder column 1504. For example, "selection and registration/update of new product source" is displayed in the target sub process column 1502, "material procurement G" is displayed in the hearing part column 1503, and "Kimura" is displayed in the hearing responder column 1504.

The second chapter inputting screen 6021 of FIG. 15 displays "2. Purpose and Feature of Process" and includes a process purpose column 1511, a process range column 1512, a pre-process column 1513, a post-process column 1514, and a process execution manager column 1515. For example, "processes of purchase of raw material and parts associated with production (other than DO TO DE CR) of consumable goods in plant and supply and expense are described" is displayed in the process purpose column 1511, "processes from selection and registration of new product source until registration of purchase price for raw material, ordering of raw material and parts, fixing of the amount payable, storage of bill, and expenses are described" is displayed in the process range column 1512, "cost accounting_R&D project accounting cost accounting_cost accounting_production of consumable goods" is displayed in the pre-process column 1513, "present deposit payment, cost accounting, inventory clearance, asset management, financial statement preparation_financial statement preparation_financial statement preparation" is displayed in the post-process column 1514, and "procurement manager takes charge of the ordering to storage of the bill is displayed in the process execution manager column 1515.

The third chapter inputting screen 6031 of FIG. 16 displays "3. Relevant important accounting items and assertions" and includes an account code column 1601, an important account column 1602, a reality column 1603, a completeness column 1604, a rights and duties column 1605, a test column 1606, a period allocation column 1607, and a display column 1608. For example, "005000" is displayed in the account code column 1601, "inventory clearance" is displayed in the important account column 1602, and the reality column 1603 and the display column 1608 display the corresponding.

The fourth chapter inputting screen 6041 of FIG. 16 displays "4. Sub Process" and includes a screen left side 6042 and a screen right side 6043. For example, a layered structure of a sub process in "1. Selection and registration/update of new product source" is displayed in the screen left side 6042 and details of one selected in the screen left side 6042 is displayed in the screen right side 6043.

A specific example of an output (in the form of a business process narrative) of an integrated document will be described with reference to FIG. 17. This specific example corresponds to FIG. 8.

The integrated document shown in FIG. 17 is obtained by displaying the integrated document shown in FIGS. 15 and 16 in the form of a business process narrative. FIG. 17(A) shows "1. Target Range and Person in Charge of Sub Process (Interview)" and corresponds to the first chapter inputting screen 6011. FIG. 17(B) shows "2. Purpose and Feature of Process" and corresponds to the second chapter inputting screen 6021 of FIG. 15. FIG. 17(C) is "3. Important Account Item and Assertion" and corresponds to the third chapter inputting screen 6031 of FIG. 16, FIG. 17(D) is "4. Sub Process" and corresponds to the fourth chapter inputting screen 6041 of FIG. 16, and FIG. 17(E) shows "5. Review of Used information System."

A specific example of an output (in the form of a table" of an integrated document will be described with reference to FIG. 18. This specific example corresponds to FIG. 9.

FIG. 18(A) shows an example in which "sub process", "sub step", "business case 1", "business case 2", "responsible subject and participant", "content", "ledger sheet and evidence", "execution time", "determination criterion or condition" in the business process narrative are output in the form of a table. For example, "selection and registration/update of new product source" is input as the sub process, "registration of new product code and the like/registration of BOM and the like" is input as the sub step, "guarantee of quantity G, innovation of process G, person in charge of management of plant G" is input as the responsible subject and the participant, "[product and part number master registering screen] of [integrated production management system] is input and registered. [integrated production management system] is automatically updated to [product master] of [accounting system] in night batch" is input as the content, "time when product source make a decision" is input as the execution time, and "check of criterion as product source" is displayed as the determination criterion or condition.

FIG. 18(B) shows an example in which "assertion", "risk and control number", "recognized risk", "recognized control", "risk test", "risk classification", and "control type" in the RCM are output in the form of a table. For example, "R001" is displayed as the risk and control number, "imaginary vendor/bad business condition; there is a danger to register a transaction with a vendor not having quality guaranteeing ability" is displayed as the recognized risk, "C001, C002, C003, C004" is displayed as the recognized control, "high" is displayed as the frequency of the risk test, and "finance" is displayed as the risk classification.

The assertion includes "reality", "completeness", "test", and "rights and duties". "Period allocation" and "display" may be further included in the assertion.

The risk test includes importance, frequency, and risk test, but "effect degree", "occurrence probability", and "effect degree×occurrence probability" may be used instead of them.

FIG. 18(C) shows an example in which "evidence", "procedure", "test result", "comment", "reference evidence", and "key control" in the WT are output in the form of a table.

Figure 19:
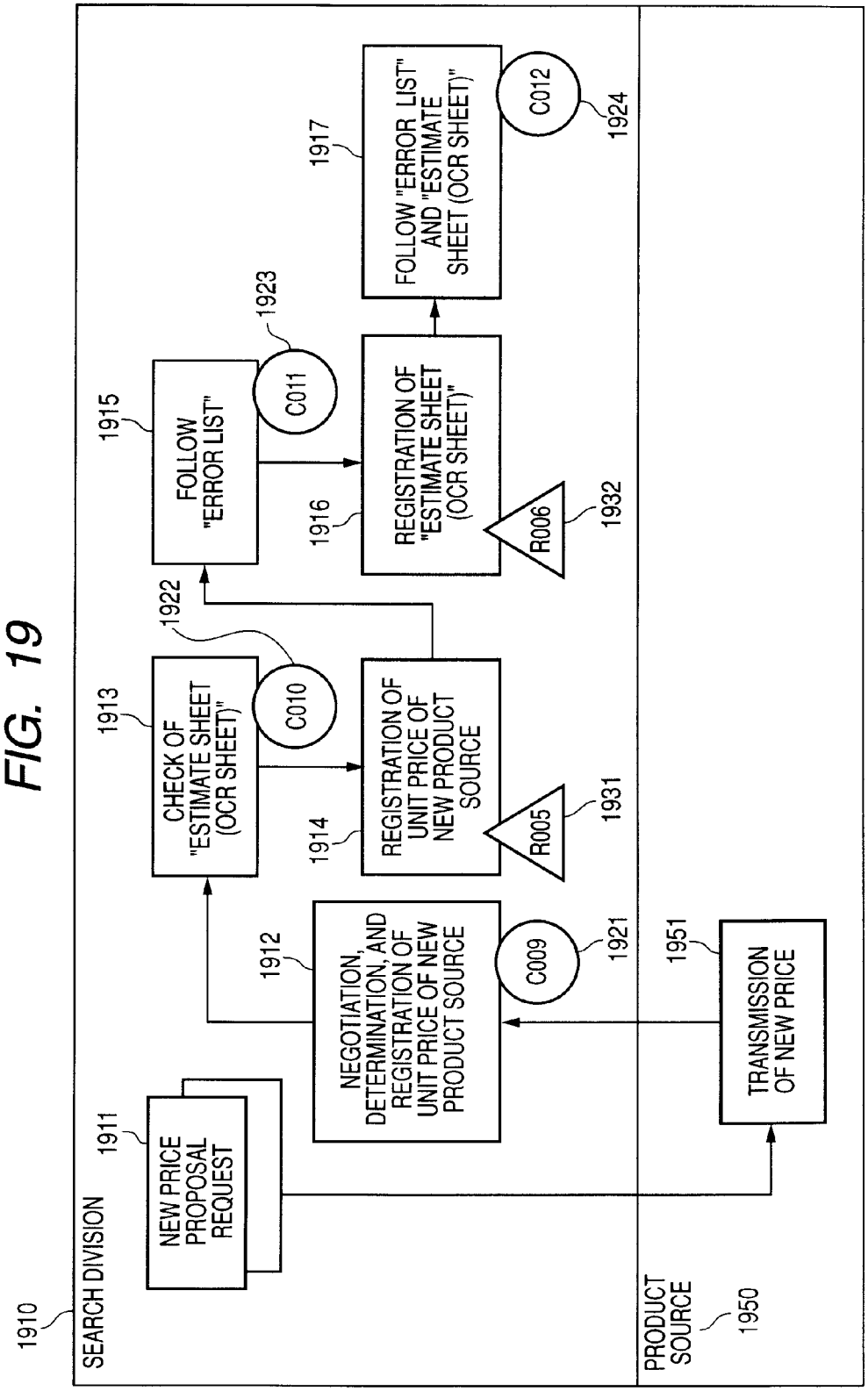
FIG. 19 is an explanatory diagram illustrating a specific example of a display screen of a business flow diagram.

A specific example of a business flow diagram displaying screen will be described with reference to FIG. 19. This specific example corresponds to FIG. 10.

The flow diagram outputting module 44 creates a flow diagram for each organization (here, search division 1910 and product source 1950).

The search division 1910 includes a new price proposal request 1911 as a sub step and negotiation, determination, and registration of product unit price 1912 of a new product source, "estimate sheet (OCR sheet)" check 1913, registration of product unit price 1914 of a new product source, "error list" follow 1915, "estimate sheet (OCR sheet)" registration 1916, and an "error list" and "estimate sheet (OCR sheet)" follow 1917 as activities. The product source 1950 includes new price proposal 1951 as an activity. It is indicated by an arrow that the processing order is an order of 1911, 1951, 1912, 1913, 1914, 1915, 1916, and 1917.

C0091921 as a control is marked to correspond to the negotiation, determination, and registration of product unit price 1912 of a new product source, C0101932 as a control is marked to correspond to the check of "estimate sheet (OCR sheet)" 1913, R0051931 as a risk is marked to correspond to the registration of product unit price 1914 of a new product source, C0111923 as a control is marked to correspond to the "error list" follow 1915, R0061932 as a risk is marked to correspond to the "estimate sheet (OCR sheet)" registration 1916, and C0121924 as a control is marked to correspond to the "error list" and "estimate sheet (OCR sheet)" follow 1917.

Although it has been described in the above-mentioned embodiment that the output of a document is to display the document on a screen, the document may be printed by a printer, may be stored in a memory device, or may be transmitted to another device.

Figure 20:
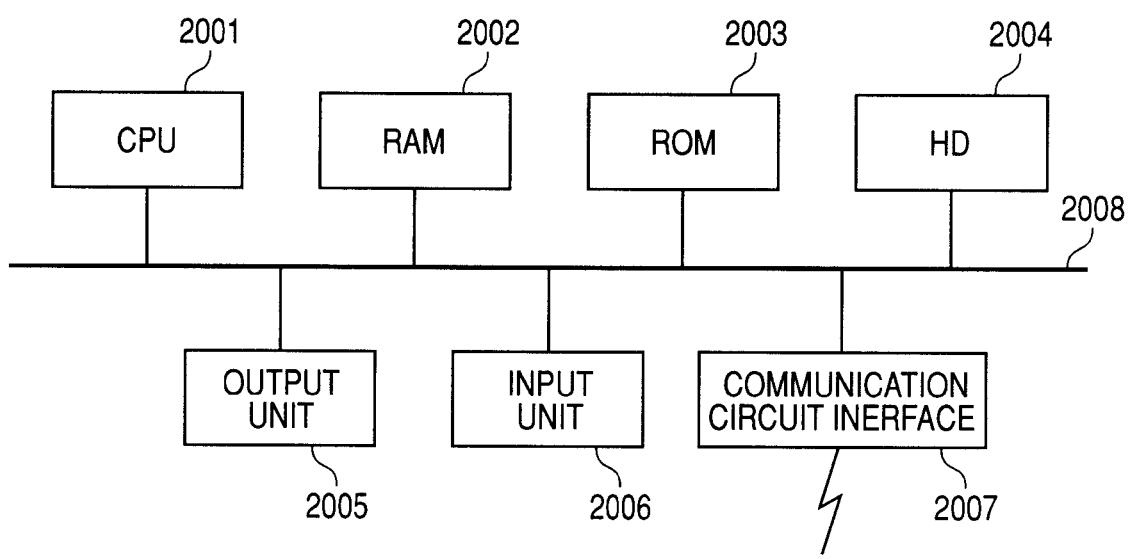
FIG. 20 is a block diagram illustrating a hardware configuration of a computer according to an embodiment of the invention.

The hardware configuration of a computer for executing the program according to this embodiment is similar to that of usual computers as shown in FIG. 20. Specifically, the client 220 is embodied by a personal computer and the document processing server 230 is embodied by a computer serving as a server. The computer includes a CPU 2001 for executing programs of modules such as the activity inputting module 12, the resource inputting module 15, the knowledge and information inputting module 18, a commoditizing module 21, and the integrated document outputting module 74, a RAM 2002 for storing the programs or data, a ROM 2003 for storing programs for starting up the computer, an HD 2004 which is an auxiliary memory, an input unit 2006 for inputting data, such as a keyboard and a mouse, an output unit 2005 such as a CRT or an LCD, a communication interface 2007 for connection to a communication network, and a bus 2008 for sending and receiving data therebetween. Plural the computers may be connected to each other through a network.

The hardware configuration of FIG. 20 shows only an example. Accordingly, the embodiment of the invention is not limited to the configuration shown in FIG. 20, but any configuration may be used as long as it can execute the modules described in this embodiment. For example, some modules may be constructed by specific hardware (for example, ASIC). Particularly, some modules may be mounted on mobile phones, game machines, car navigation apparatuses, information appliances, copiers, facsimiles, scanners, printers, complex machines (also called multi-function copiers which have functions of a scanner, a printer, a copier, and a facsimile).

The above-mentioned programs may be provided in a state where they are stored in recording mediums or may be provided through communication means. In this case, the above-mentioned programs may be considered as a "computer-readable recording medium having recorded thereon a program."

The "computer-readable recording medium having recorded thereon a program" means a computer-readable recording medium having recorded thereon a program, which is used to install, execute, and circulate programs.

Examples of the recording medium include "DVD-R, DVD-RW, DVD-RAM, and the like" defined in the DVD forum and "DVD+R, DVD+RW, and the like" defined in DVD+RW as a digital versatile disc (DVD), CD-ROM, CD-R, CD-RW, and the like as a compact disc (CD), an optical magnetic disc (MO), a flexible disc (FD), a magnetic tape, a hard disc, a ROM, an EEPROM, a flash memory, a RAM, and the like.

All or a part of the above-mentioned programs may be recorded on the recording mediums for storage or circulation. The programs may be transmitted through wired networks, wireless networks, or combinations thereof which are used in local area networks (LAN), metropolitan area networks (MAN), wide area networks (WAN), Internet, intranets, and extranets, or may be transmitted with carrier waves.

The programs may be a part of another program or may be recorded in a recording medium along with an independent program. The programs may be divided and recorded on plural recording mediums. The programs may be compressed or encoded, and may be stored in any type as long as it could be reconstructed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A document processing system comprising:
an activity storage that correlates and stores activity identifiers for uniquely identifying activities, activity names, responsible subjects, and activity contents;
a business process narrative storage that correlates and stores levels of a plurality of layers indicating business processes of a business process narrative, and activity identifiers, the levels indicating levels of the business processes of the business process narrative;
a risk storage that correlates and stores risk identifiers for uniquely identifying risks, risk names, and activity identifiers;
a control storage that correlates and stores control identifiers for uniquely identifying controls, control names, and activity identifiers;
a processor that functions as an information extracting unit that extracts the activity name, the responsible subject, and the activity content, which correspond to the specific activity identifier stored in the activity storage on the basis of the activity identifier, extracts the levels of the plurality of layers indicating the business processes, which correspond to the specific activity identifier stored in the business process narrative storage on the basis of the activity identifier, extracts the risk name, which corresponds to the specific activity identifier stored in the risk storage on the basis of the activity identifier, and extracts the control name, which corresponds to the specific activity identifier stored in the control storage on the basis of the activity identifier; and
a document preparing and outputting unit that prepares and outputs an internal control document visually displaying the activity name, the responsible subject, the activity content, the levels of the plurality of layers indicating the business processes, the risk name, and the control name, which are extracted by the information extracting unit,
wherein the number of the plurality of layers is five, and wherein:
the plurality of layers include a sub process, a sub step, a first business case, and a second business case;
the sub process is a business range when an organization in charge of a business is a same division or company;

the sub step is a business range when a main process in charge is the same;

the first business case and the second business case are respectively branched and described by conditions when a plurality of business patterns exist in a same sub step; and the first business step is a business unit corresponding to an activity, the business step being correlated with one activity.

2. A computer readable medium storing a program causing a computer to execute a process for performing a document processing, the process comprising:

correlating and storing activity identifiers for uniquely identifying activities, activity names, responsible subjects, and activity contents;

correlating and storing levels of a plurality of layers indicating business processes of a business process narrative, and activity identifiers, the levels indicating levels of the business processes of the business process narrative;

correlating and storing risk identifiers for uniquely identifying risks, risk names, and activity identifiers;

correlating and storing control identifiers for uniquely identifying controls, control names, and activity identifiers;

extracting the activity name, the responsible subject, and the activity content corresponding to the specific activity identifier on the basis of the activity identifier;

extracting the levels of the plurality of layers indicating the business processes corresponding to the specific activity identifier on the basis of the activity identifier;

extracting the risk name corresponding to the specific activity identifier on the basis of the activity identifier;

extracting the control name corresponding to the specific activity identifier on the basis of the activity identifier; and preparing and outputting an internal control document visually displaying the activity name, the responsible subject, the activity content, the levels of the plurality of layers indicating the business processes, the risk name, and the control name, which are extracted, wherein the number of the plurality of layers is five, and
wherein:

the plurality of layers include a sub process, a sub step, a first business case, and a second business case;

the sub process is a business range when an organization in charge of a business is a same division or company;

the sub step is a business range when a main process in charge is the same;

the first business case and the second business case are respectively branched and described by conditions when a plurality of business patterns exist in a same sub step; and the first business step is a business unit corresponding to an activity, the business step being correlated with one activity.

* * * * *